United States Patent
Cape et al.

(10) Patent No.: US 12,214,614 B2
(45) Date of Patent: Feb. 4, 2025

(54) MICRO-OPTIC SECURITY DEVICE WITH ZONES OF COLOR

(71) Applicant: Crane & Co., Inc., Dalton, MA (US)

(72) Inventors: Samuel M. Cape, Woodstock, GA (US); Jonathan D. Gosnell, Cumming, GA (US); Benjamin E. Bleiman, Cumming, GA (US); Jennifer Cowan, Marietta, GA (US); Nicholas G. Pearson, Amherst, NH (US); Ryan Toole, Washington, DC (US)

(73) Assignee: Crane & Co., Inc., Dalton, MA (US)

( * ) Notice: Subject to any disclaimer, the term of this patent is extended or adjusted under 35 U.S.C. 154(b) by 0 days.

(21) Appl. No.: 18/316,897

(22) Filed: May 12, 2023

(65) Prior Publication Data

US 2023/0278357 A1  Sep. 7, 2023

Related U.S. Application Data

(62) Division of application No. 16/996,718, filed on Aug. 18, 2020, now Pat. No. 11,685,180.

(Continued)

(51) Int. Cl.
*B42D 25/324* (2014.01)
*B41M 3/14* (2006.01)
(Continued)

(52) U.S. Cl.
CPC .............. *B42D 25/36* (2014.10); *B41M 3/14* (2013.01); *B42D 25/30* (2014.10); *B42D 25/324* (2014.10);
(Continued)

(58) Field of Classification Search
CPC .................................................. B42D 25/324
See application file for complete search history.

(56) References Cited

U.S. PATENT DOCUMENTS

| | | |
|---|---|---|
| 5,085,514 A | 2/1992 | Mallik et al. |
| 7,333,268 B2 | 2/2008 | Steenblik et al. |
| (Continued) | | |

FOREIGN PATENT DOCUMENTS

| | | |
|---|---|---|
| CN | 1906547 A | 1/2007 |
| CN | 102186679 A | 9/2011 |
| (Continued) | | |

OTHER PUBLICATIONS

Hearing Notice dated Dec. 19, 2023, in connection with Indian Application No. 202227003909, 2 pages.

(Continued)

*Primary Examiner* — Kyle R Grabowski

(57) ABSTRACT

A micro-optic security device with zonal color transitions includes a planar array of focusing elements, an image icon layer including a plurality of retaining structures, the plurality of retaining structures defining isolated volumes at a first depth within the image icon layer, a first zone of image icons, the first zone of image icons having a first predefined subset of the plurality of retaining structures, wherein the isolated volumes of retaining structures of the first predefined subset of the plurality of retaining structures contain cured pigmented material of a first color, and a second zone of image icons, the second zone of image icons including a second predefined subset of the plurality of retaining structures, wherein the isolated volumes of retaining structures of the second predefined subset of the plurality of retaining structures contain cured pigmented material of a second color, wherein the second color contrasts with the first color.

8 Claims, 15 Drawing Sheets

Related U.S. Application Data

(60) Provisional application No. 62/888,957, filed on Aug. 19, 2019.

(51) Int. Cl.
| | |
|---|---|
| *B42D 25/00* | (2014.01) |
| *B42D 25/30* | (2014.01) |
| *B42D 25/36* | (2014.01) |
| *B42D 25/43* | (2014.01) |
| *G02B 3/00* | (2006.01) |
| *G02B 17/00* | (2006.01) |
| *B42D 25/23* | (2014.01) |
| *B42D 25/24* | (2014.01) |
| *B42D 25/29* | (2014.01) |
| *B42D 25/44* | (2014.01) |
| *B42D 25/445* | (2014.01) |

(52) U.S. Cl.
CPC .......... *B42D 25/43* (2014.10); *G02B 3/0037* (2013.01); *G02B 17/002* (2013.01); *B42D 25/23* (2014.10); *B42D 25/24* (2014.10); *B42D 25/29* (2014.10); *B42D 25/44* (2014.10); *B42D 25/445* (2014.10)

(56) References Cited

U.S. PATENT DOCUMENTS

| | | | |
|---|---|---|---|
| 7,468,842 B2 | 12/2008 | Steenblik et al. | |
| 11,059,319 B2 | 7/2021 | Lister | |
| 11,685,180 B2 | 6/2023 | Cape et al. | |
| 2005/0180020 A1* | 8/2005 | Steenblik | B42D 25/369 359/626 |
| 2007/0058260 A1 | 3/2007 | Steenblik et al. | |
| 2008/0160226 A1 | 7/2008 | Kaule et al. | |
| 2009/0121412 A1 | 5/2009 | Koyanagi | |
| 2010/0109317 A1* | 5/2010 | Hoffmuller | B41M 3/14 283/85 |
| 2011/0027538 A1* | 2/2011 | Hoffmann | B42D 25/425 428/173 |
| 2012/0098249 A1 | 4/2012 | Rahm et al. | |
| 2012/0194916 A1 | 8/2012 | Cape et al. | |
| 2013/0056971 A1 | 3/2013 | Holmes | |
| 2013/0094789 A1 | 4/2013 | Hoffman et al. | |
| 2014/0376088 A1* | 12/2014 | Kim | B42D 25/29 359/463 |
| 2015/0070350 A1 | 3/2015 | Cape et al. | |
| 2015/0076808 A1* | 3/2015 | Kim | B42D 25/41 283/85 |
| 2017/0024639 A1 | 1/2017 | Lankinen et al. | |
| 2017/0165997 A1 | 6/2017 | Holmes | |
| 2017/0173990 A1* | 6/2017 | Cape | G02B 3/0006 |
| 2018/0194090 A1 | 7/2018 | Holmes | |
| 2018/0196980 A1 | 7/2018 | Holmes et al. | |
| 2018/0231695 A1 | 8/2018 | Zhang | |
| 2018/0272788 A1 | 9/2018 | Bleiman et al. | |
| 2018/0299584 A1 | 10/2018 | Zhang | |
| 2020/0139742 A1 | 5/2020 | Lister | |

FOREIGN PATENT DOCUMENTS

| | | | |
|---|---|---|---|
| CN | 102712205 A | 10/2012 | |
| CN | 106597581 A | 4/2017 | |
| CN | 106808835 A | 6/2017 | |
| CN | 109070622 A | 12/2018 | |
| DE | 102006029852 A1 * | 1/2008 | ....... B29D 11/00365 |
| DE | 102009022612 A1 | 12/2010 | |
| DE | 102011114750 A1 | 4/2013 | |
| DE | 102011115125 A1 * | 4/2013 | ............ B42D 25/29 |
| EP | 2760676 B1 | 11/2015 | |
| GB | 2514030 A | 11/2014 | |
| JP | 2015-509058 A | 3/2015 | |
| KR | 10-2012-0058726 A | 6/2012 | |
| WO | 2006125224 A2 | 11/2006 | |
| WO | 2009121578 A2 | 10/2009 | |
| WO | 2012062871 A1 | 5/2012 | |
| WO | WO-2013045073 A1 * | 4/2013 | ........... B42D 25/342 |
| WO | 2016016638 A1 | 2/2016 | |
| WO | 2017198486 A2 | 11/2017 | |

OTHER PUBLICATIONS

The First Office Action dated Nov. 30, 2023, in connection with Chinese Application No. 202080058681.0, 19 pages.
International Search Report and Written Opinion of the International Searching Authority in connection with International Application No. PCT/US2020/047038 dated Jan. 13, 2021, 10 pages.
Examination Report dated Sep. 7, 2022, in connection with Indian Patent Application No. 202227003909, 4 pages.
Notice on the Result of Substantive Examination dated Oct. 17, 2023, in connection with Indonesian Application No. P00202203052, 6 pages.
Supplementary European Search Report dated Oct. 10, 2023, in connection with European Application No. 20854766.1, 10 pages.
Notification to Grant Patent Right for Invention dated Mar. 26, 2024, in connection with Chinese Application No. 202080058681.0, 3 pages.
Notice of Reasons for Refusal dated Feb. 27, 2024, in connection with Japanese Application No. 2022-511292, 10 pages.
Office Action and Search Report dated Feb. 12, 2024, in connection with Russian Application No. 2022107077/28(014585), 20 pages.
Decision to Grant dated Jun. 7, 2024, in connection with Russian Application No. 2022107077/28(014585), 17 pages.
Non-final Office Action dated Apr. 3, 2024, in connection with U.S. Appl. No. 18/316,904, 7 pages.
Final Office Action dated Jul. 18, 2024, in connection with U.S. Appl. No. 18/316,904, 8 pages.
Decision of Refusal dated Aug. 6, 2024, in connection with Japanese Application No. 2022-511292, 7 pages.
1st Substantive Requirement dated Nov. 26, 2024, in connection with Mexican Patent Application No. MX/a/2022/001847, 6 pages.

* cited by examiner

MICRO-OPTIC SECURITY DEVICE WITH ZONES OF COLOR

CROSS-REFERENCE TO RELATED APPLICATION(S) AND CLAIM OF PRIORITY

This application is a divisional application of U.S. application Ser. No. 16/996,718, filed on Aug. 18, 2020, which claims priority under 35 U.S.C. § 119(e) to U.S. Provisional Application No. 62/888,957, filed Aug. 19, 2019, the disclosure of which is incorporated herein by reference.

TECHNICAL FIELD

This disclosure relates generally to anti-counterfeiting of secure and/or high value documents, such as banknotes, passports and tickets. More specifically, this disclosure relates to a micro-optic security device with zones of color.

BACKGROUND

Micro-optic security devices, or devices comprising an array of micro-scale focusing elements and arrangements of image icons (for example, sub-micro-scale regions of colored material) in the focal plane of the focusing elements, which work together to provide one or more characteristic visual effects (for example, a synthetic image having a three-dimensional appearance) have proven heretofore generally effective in providing trustworthy visual indicia of the authenticity of value documents, such as currency notes and passports.

The performance and effectiveness of micro-optic security devices as visual level (i.e., detectable with a human eye, rather than with a banknote equipment manufacturer ("BEM") device or other specialized machinery) indicia of the authenticity of a document, can depend, at least in part, on the extent to which the micro-optic security device provides a visual effect which visually engages users, and to which the appearance of the security device or visual effects provided by the security device is flexible and amenable to updates and revisions. For example, a synthetic image with dull colors or blurry features (which can occur when the image icon layer is out of focus) may be more frequently overlooked by users, thereby increasing the likelihood of counterfeit banknotes circulating without notice. Similarly, where changes to a security device require expensive or time-consuming retooling of manufacturing processes, the interval between updates and revisions to a security device used on a security document (for example, a banknote) will be greater, and malicious actors will have more time and opportunity to try and develop counterfeits.

Thus, making micro-optical security devices more visually engaging and the processes for making such devices more amenable to dynamic adjustment and redesign remains a source of technical challenges and opportunities for improvement in the field of micro-optic security devices and methods for manufacturing same.

SUMMARY

This disclosure provides a micro-optic security device with zones of color.

In a first embodiment, a micro-optic security device with zonal color transitions includes a planar array of focusing elements, an image icon layer including a plurality of retaining structures, the plurality of retaining structures defining isolated volumes at a first depth within the image icon layer, a first zone of image icons, the first zone of image icons having a first predefined subset of the plurality of retaining structures, wherein the isolated volumes of retaining structures of the first predefined subset of the plurality of retaining structures contain cured pigmented material of a first color, and a second zone of image icons, the second zone of image icons including a second predefined subset of the plurality of retaining structures, wherein the isolated volumes of retaining structures of the second predefined subset of the plurality of retaining structures contain cured pigmented material of a second color, wherein the second color contrasts with the first color.

In a second embodiment, a method of making a micro-optic security device includes applying a layer of uncured pigmented material of a first color to an image icon layer of a micro-optic security device, the image icon layer including a plurality of retaining structures, the plurality of retaining structures defining isolated volumes at a first depth within the image icon layer, and scraping the image icon layer such that uncured pigmented material of the first color only remains in the retaining structures of the image icon layer at depths equal to or less than the first depth. The method further includes selectively curing the uncured pigmented material of the first color by directing a first pattern of light at a first zone of the image icon layer to form a first arrangement of image icons, and removing the uncured pigmented material of the first color.

In a third embodiment, a method of making a micro-optic security device includes selectively applying a first volume of uncured pigmented material of a first color to a first region of an image icon layer of a micro-optic security device, the image icon layer including a plurality of retaining structures, the plurality of retaining structures defining isolated volumes at a first depth within the image icon layer. The method further includes selectively applying a second volume of uncured pigmented material of a second color to a second region of the image icon layer of the micro-optic security device, wherein at least part of the second region contacts at least part of the first region along a wet border on a surface of the image icon layer and scraping the image icon layer such that uncured pigmented material of the first color is substantially confined to retaining structures in a first zone of the image icon layer, and uncured pigmented material of the second color is substantially confined to retaining structures in a second zone of the image icon layer. Additionally, the method includes curing the uncured pigmented material of the first color and the uncured pigmented material of the second color, wherein the first zone of the image icon layer and the second zone of the image icon layer meet along a region of the image icon layer proximate to the location of the wet border.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure.

Figure 1:
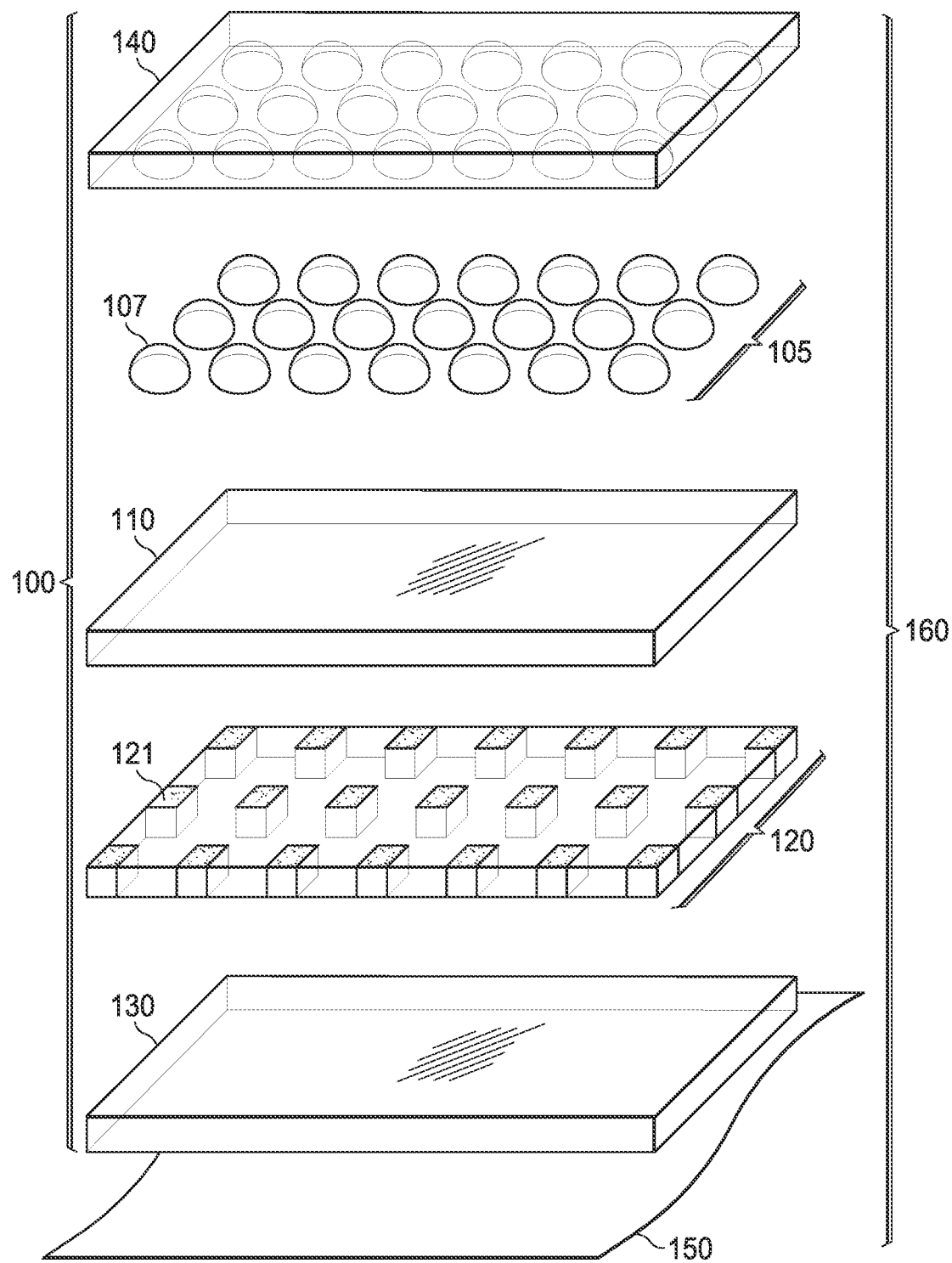
FIG. 1 illustrates an example of a micro-optic system according to certain embodiments of this disclosure.

FIG. 1 illustrates an example of a micro-optic system 100 according to certain embodiments of this disclosure.

Referring to the non-limiting example of FIG. 1, micro-optic system 100 comprises, at a fundamental level, a planar array of focusing elements 105 (including, for example, focusing element 107), and an arrangement of image icons 120 (including, for example, image icon 121). According to various embodiments, each focusing element of planar array of focusing elements 105 has a footprint, in which one or more image icons of arrangement of image icons 120 is positioned. In certain embodiments, the locations of the image icons within arrangement of image icons 120 within the respective footprint of each focusing element correspond to spaces between retaining structures in an image icon layer. According to some embodiments, the ratio of the resolution of planar array of focusing elements 105 (for example, the number of focusing elements provided in a specified area, such as a 1×1 mm box) relative to the resolution of the arrangement of image icons 120 (for example, the number of focusing elements provided in the specified area) is 1 or greater. As a non-limiting example, each image icon within arrangement of image icons 120 may fall within the footprints of multiple focusing elements. As a further non-limiting example, there may not be image icons within the footprint of every focusing element within the specified area. Additionally, in some embodiments according to this disclosure, the ratio of the resolution of planar array of focusing elements 105 relative to the resolution of the arrangement of image icons 120 may have a value of less than 1. As a non-limiting example, there may be multiple image icons within the footprint of a particular focusing element. Put differently, zones of zonally cured pigmented material according to embodiments of this disclosure can be of sub-focusing element, and multi-focusing element scales. As used in this disclosure, "uncured pigmented material" encompasses polymeric inks, pigmented polymers, as well as dye-based inks which transition from a wet, uncured state, to a more rigid, drier state in response to a chemical reaction induced through the application of a curing light (for example, ultraviolet curing light.

According to certain embodiments, plurality of focusing elements 105 comprises a planar array of micro-optic focusing elements. In some embodiments, the focusing elements of planar array of focusing elements 105 comprise micro-optic refractive focusing elements (for example, plano-convex or GRIN lenses), with a lensing surface providing a curved interface between regions of dissimilar indices of refraction (for example, a polymer lens material and air). Refractive focusing elements of planar array of focusing elements 105 are, in some embodiments, produced from light cured resins with indices of refraction ranging from 1.35 to 1.7, and have diameters ranging from 5 μm to 200 μm. In various embodiments, the focusing elements of planar array of focusing elements 105 comprise reflective focusing elements (for example, very small concave mirrors), with diameters ranging from 5 μm to 50 μm. While in this illustrative example, the focusing elements of planar array of focusing elements 105 are shown as comprising circular plano-convex lenses, other refractive lens geometries, for example, lenticular lenses, are possible and within the contemplated scope of this disclosure.

As shown in the illustrative example of FIG. 1, arrangement of image icons 120 comprises a set of image icons (including image icon 121), positioned at predetermined locations within the footprints of the focusing elements of planar array of focusing elements 105. According to various embodiments, the individual image icons of arrangement of image icons 120 comprise regions of zonally light cured material in the spaces defined by retaining structures in a structured image icon layer. As used in this disclosure, the term "structured image layer" encompasses a layer of material (for example, a light-curable resin) which has been embossed, or otherwise formed to comprise structures (for example, recesses, posts, grooves, or mesas) for positioning and retaining image icon material. According to certain embodiments, arrangement of image icons 120 is constructed to facilitate dynamic redesign and reconfiguration of the image icon structure of micro-optic security device 100. For example, arrangement of image icons 120 is, in some embodiments, formed by selectively filling and curing retaining structures (as shown in FIG. 1, square wells) with uncured pigmented material of one or more colors which are then cured to create regions, or zones of color within arrangement of image icons 120. In this non-limiting example, the different colors within arrangement of image icons 120 are represented by different fill patterns on a surface of the image icons most proximate to the focusing layers. For example, image icon 121 is shown as having the same color as image icons in its row.

As shown in the illustrative example of FIG. 1, in certain embodiments, micro-optic system 100 includes an optical spacer 110. According to various embodiments, optical spacer 110 comprises a film of substantially transparent material which operates to position image icons of arrangement of image icons 120 in or around the focal plane of focusing elements of planar array of focusing elements 105. In certain embodiments according to this disclosure, optical spacer 110 comprises a manufacturing substrate upon which one or more layers of light curable material can be applied, embossed and flood cured to form retaining structures, which can then be filled with pigmented light curable material which is zonally cured. As used in this disclosure, the term "filled," as used in the context of filling retaining structures of an image icon layer encompasses both filling all of the available volume of the retaining structure with uncured pigmented material, but also filling the majority (for example, 50-80 percent) of the available volume of the retaining structure with uncured material. In certain embodiments, the light-curable material used to form arrangement of image icons 120 is a pigmented, ultraviolet (UV)-curable polymer.

In certain embodiments according to this disclosure, micro-optic system 100 comprises a seal layer 140. According to certain embodiments, seal layer 140 comprises a thin (for example, a 2 µm to 50 µm thick layer) of substantially clear material which interfaces on a lower surface, with focusing elements of the planar array of focusing elements 105, and comprises an upper surface with less variation in curvature (for example, by being smooth, or by having a surface whose local undulations are of a larger radius of curvature than the focusing elements) than the planar array of focusing elements 105.

As shown in the non-limiting example of FIG. 1, in certain embodiments, micro-optic system 100 can be attached, for example, by an adhesive layer 130, to a substrate 150, to form a security document 160. According to various embodiments, substrate 150 can be a sheet of currency paper, or a polymeric substrate. According to some embodiments, substrate 150 is a thin, flexible sheet of a polymeric film, biaxially oriented polypropylene (BOPP). In various embodiments, substrate 150 is a section of a synthetic paper material, such as TESLIN®. According to some embodiments, substrate 150 is a section of a polymeric card material, such as a polyethylene terephthalate (PET) blank of a type suitable for making credit cards and driver's licenses.

Figure 2A:
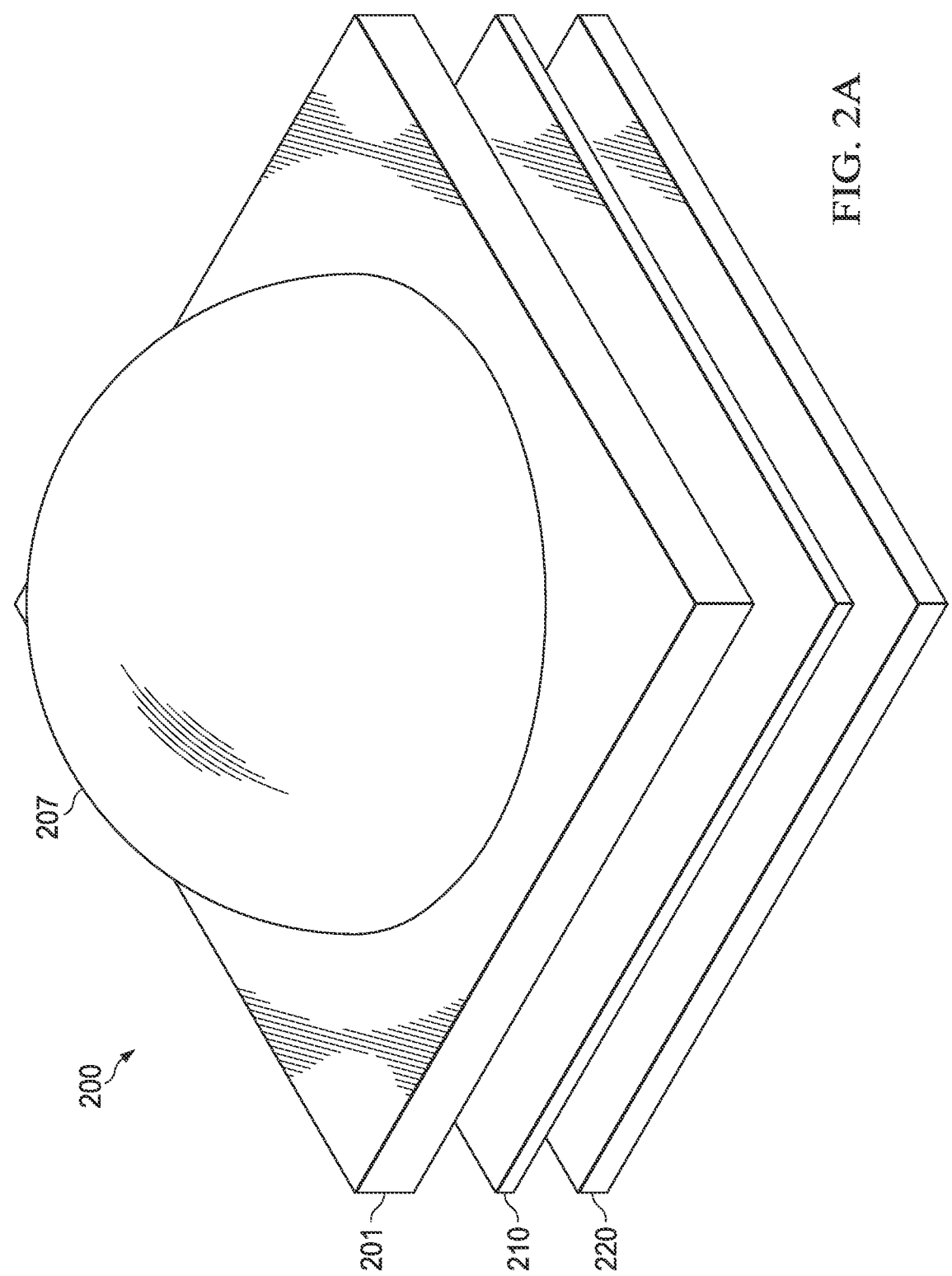
FIGS. 2A and 2B illustrate, in exploded perspective views from above and below, a micro-optic cell within a micro-optic security device according to certain embodiments of this disclosure.
Figure 2B:
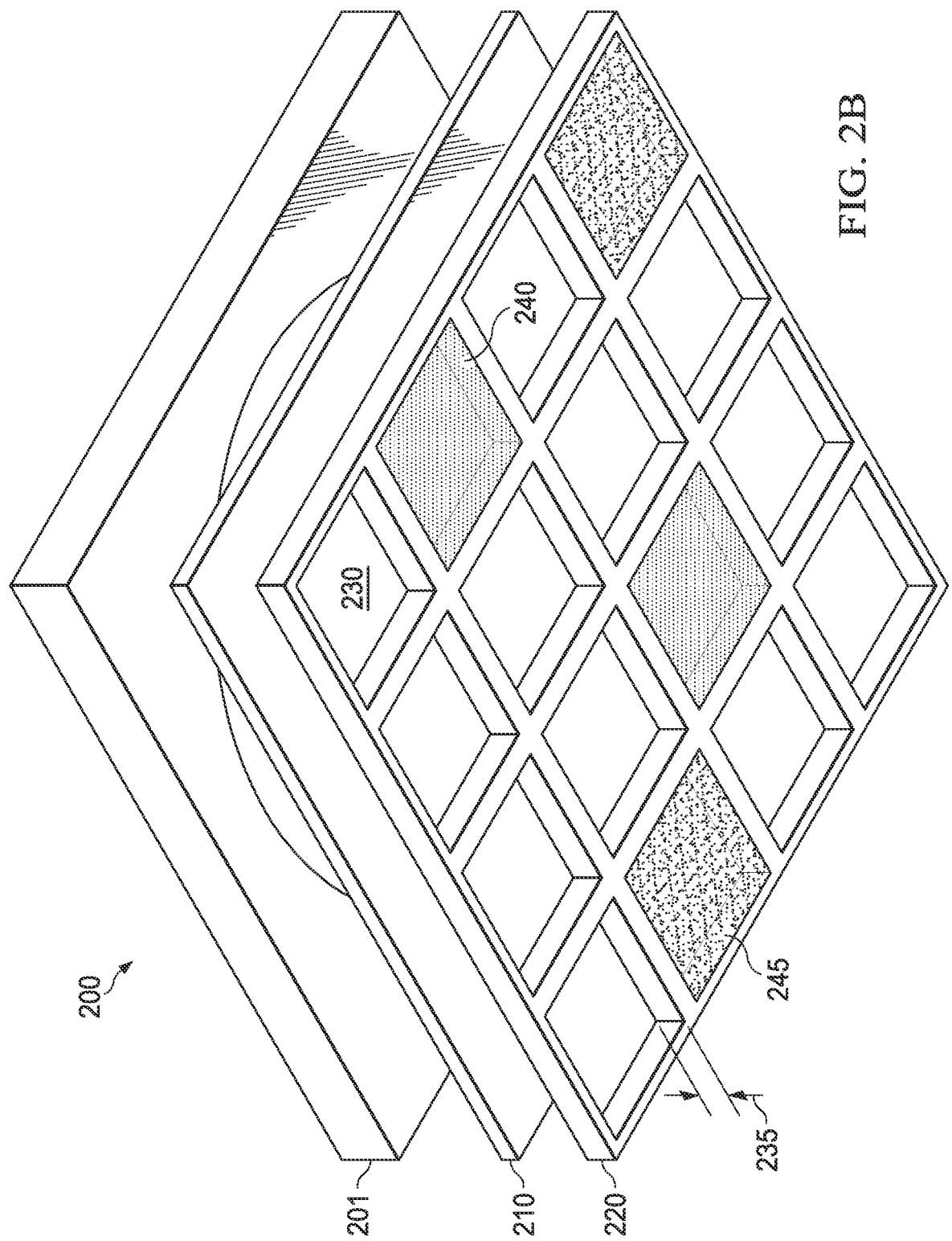

FIGS. 2A and 2B (collectively, "FIG. 2") illustrate, in exploded perspective views from above and below, a micro-optic cell 200 within a micro-optic security device (for example, micro-optic security device 100 in FIG. 1) according to certain embodiments of this disclosure. As used in this disclosure, the term "micro-optic cell" encompasses a three dimensional section of a micro-optic security device corresponding to a single focusing element within a planar array of focusing elements (for example, planar array of focusing elements 105 in FIG. 1). For convenience, structures of micro-optical cell 200 which are visible in both the view from above presented in FIG. 2A and the view from below presented in FIG. 2B are numbered similarly.

Referring to the non-limiting example of FIG. 2, micro-optic cell 200 is one of a plurality (in some embodiments, millions) of micro-optic cells forming a micro-optic security device (for example, micro-optic security device 100 in FIG. 1.) According to various embodiments, micro-optic cell 200 comprises a focusing element 207. In this illustrative example, focusing element 207 is a refractive focusing element (in this case, a plano-convex lens) which is formed by applying a layer of light curable material to an optical spacer layer 210 (for example, a layer of transparent film material also acting as a manufacturing substrate), embossing the layer to define the shape of focusing element 207, and in some embodiments, an additional optical spacer 201 (sometimes referred to as a "goo spacer") and then curing the materials with light (for example, UV light) to effect one or more chemical curing reactions to produce a layer of material of sufficient robustness for use in a micro-optic security device.

According to various embodiments, micro-optic cell 200 further comprises a section 220 of a structured image icon layer (for example, an image icon layer containing arrangement of image icons 120 in FIG. 1). Referring to the non-limiting example of FIG. 2, section 220 of the structured image icon layer comprises a plurality of retaining structures (for example, retaining structure 230), wherein each retaining structure defines an isolated volume having a first depth (for example, depth 235). In various embodiments according to this disclosure, the image icon layer comprising section 220 is constructed using a similar manufacturing technique as focusing element 207, wherein a layer of uncured light curable material is applied to a side of optical spacer 210, embossed to form a plurality of retaining structures (for example, retaining structure 230), and then exposed to a light source to activate a curing reaction in the material to produce a cured structured image icon layer 220.

As noted elsewhere in this disclosure, the dimensions by which the performance of a micro-optic security device can be measured include, without limitation, the extent to which the device and optical effects produced by the device are visually engaging. If a micro-optic security device reliably "catches a viewer's eye," then there is a greater chance that the absence of such a device, or irregularities in the appearance of the device will be noticed by users. Aesthetics beget engagement, and from an anti-counterfeiting standpoint, engagement can be highly advantageous.

Experience has shown that, sharpness and presence of multiple colors in a visual effect (for example, a synthetic image) presented by a micro-optic system can drive engagement. In many cases, a micro-optic security device is more likely to provide a sharp-looking visual effect when image icons are of a suitable thickness and are disposed within the focal plane of focusing elements of a planar array of focusing elements. According to some embodiments, suitable image icon thicknesses encompass a range of thicknesses between 0.5 µm to 3.5 µm. In some embodiments, suitable image icon thicknesses encompass a narrower range of thicknesses, such as, for example, 0.5 to 2.5 µm, or 1.5-1.8 µm. For some applications, suitable image icons have thicknesses greater than 3.5 µm or less than 0.5 µm. "Thin" icons or out-of-focus icons can lead to, without limitation, the color(s) of the synthetic image appearing washed out, and the details of the image appearing fuzzy. Additionally, the presence of image icons in an image icon layer which are two or more contrasting colors can drive visual engagement with a micro-optic security device. However, implementing multi-colored image icons can present technical challenges. One method for implementing multiple colors is to stack a first image icon layer comprising image icons of a first color atop a second image icon layer comprising image icons of a second color. However, this approach presents a number of technical challenges, such as controlling the registration of the first image icon layer relative to the second image icon layer, and the possibility that one or both of the stacked image icon layers fall outside the focal plane of the focusing elements. Additionally, where the system is configured to present a synthetic image, errors in the registration of the image icon layers relative to the focusing elements can present "jumps" or discontinuities in the dynamic appearance of the synthetic image. For example, in a synthetic image comprising an object which rotates and changes color when viewed across a range of colors, variations in the registration between the two image icon layers relative to the focusing layers may produce abrupt, or non-sequential transitions between colors or in the appearance of rotation. As an illustrative example, consider a dynamic visual effect comprising a synthetic image of a multi-colored ball moving through a first position, a second position, a third position and a fourth position in response to a change in viewing angle. In some cases, when the phasing of the elements of the image icon layer is not tightly controlled relative to the phasing of focusing elements, "jumps" or non-sequential transitions between the positions of the ball may occur. In the context of the example of a synthetic image of a ball, phasing errors may cause the ball, as it appears in the synthetic image, to "jump" from the first position to the third position, skipping the second position, in response to a change of viewing angle. Another approach to implementing multiple colors is to mechanically isolate regions of uncured pigmented material of a first color to particular locations a structured image icon layer, blade off excess pigmented material of the first color, flood cure (e.g., unselectively expose the entire surface of the image icon layer) the image icon layer, and then repeat this process for one or more additional colors. The technical challenges associated with iteratively applying a region of one color, blading excess from the device, and then flood curing the device include smearing and staining associated with, for example, amounts of pigmented material of the first color occupying locations within the image icon layer intended for pigmented material of the second color, and becoming cured by flood curing before introduction of the material of the second color. The presence of cured material of the first color in spaces intended for material of the second color can make the transitions between colors muddy or introduce unwanted colors.

Advantageously, certain embodiments according to this disclosure comprise image icons formed from light curable pigmented material of two or more contrasting colors (for example, two different primary colors, such as red and green, or different shades of a same base color, for example, black and grey). Further, certain embodiments according to this disclosure advantageously side-step the technical challenges associated with trying to achieve multiple colors by stacking image icon layers of different colors, or the technical challenges associated with iteratively trying to mechanically isolate regions of different colored inks, remove excess ink, and then flood cure the device. Instead, visual effects (for example, synthetic images) produced by micro-optic security devices according to certain embodiments of to this disclosure, exhibit sharp transitions between zones of different colors, as well as enhanced color saturation associated with positioning image icons within a single image icon layer to better ensure that the image icons are within the focal plane of the focusing elements of a planar array of focusing elements. Further, by achieving sharp transitions between zones of image icons of a first color and zones of image icons of a second within a single image icon layer, the phasing of the repetition of patterns in the image icon layer relative to the repetition pattern (for example, a grid, or hexagonal lattice) of the focusing elements can be tightly controlled, and "jumps" or abrupt changes in visual effects provided by the micro-optic security device across changes in viewing angle can be avoided.

As shown in the illustrative example of FIG. 2, within the retaining structures of image icon layer 220, there is a first zone of image icons comprising a subset of the retaining structures containing cured pigmented material of a first color (for example, first image icon 240), as well as a second zone of image icons comprising a subset of the retaining structures containing cured pigmented material of a second color (for example, second image icon 245).

FIGS. 3A through 3F illustrate aspects of the structure and manufacture of a section 300 of a structured image icon layer according to various embodiments of this disclosure. For convenience, structures which are common to one or more figures of FIGS. 3A through 3F are numbered similarly.

Figure 3A:
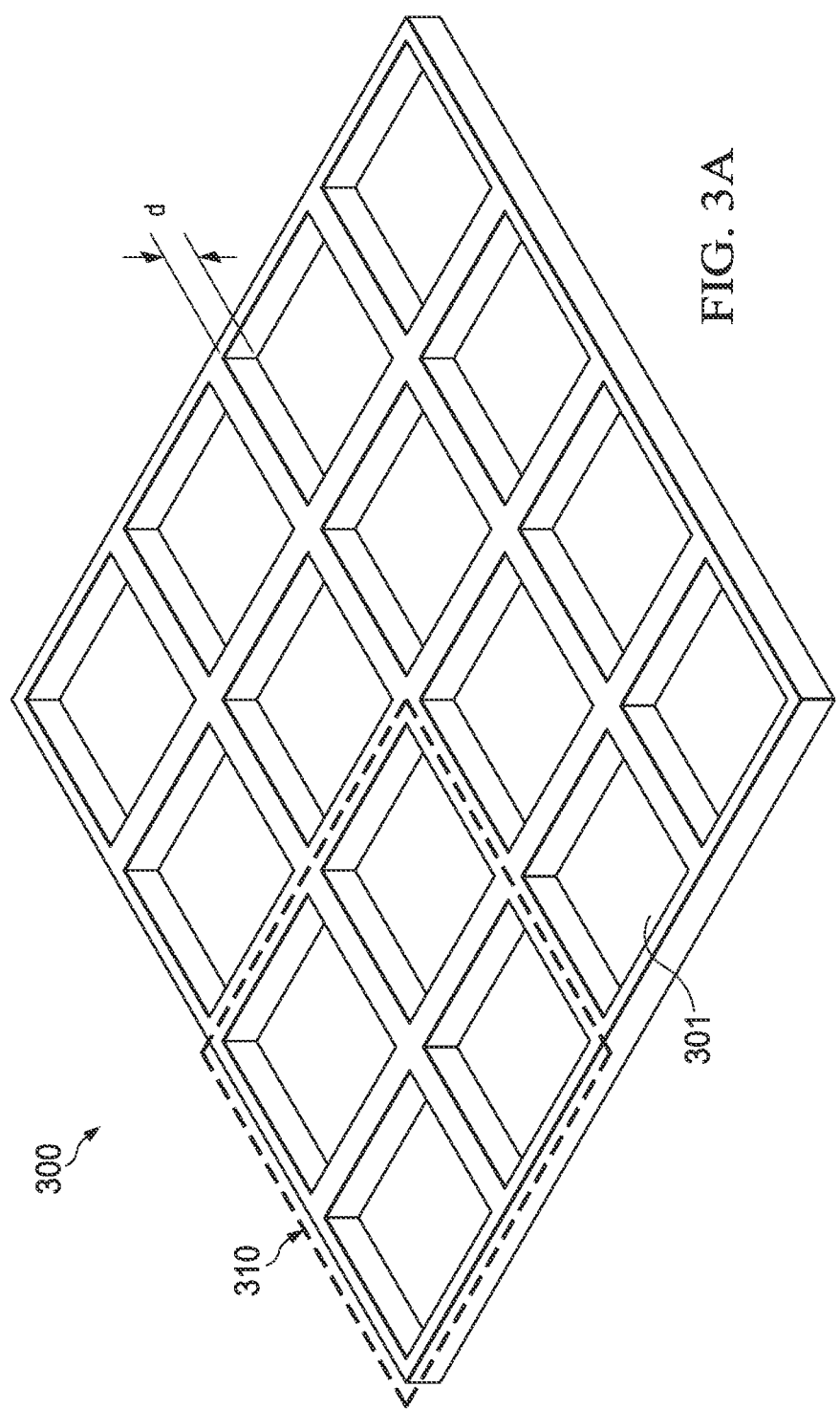
FIGS. 3A through 3F illustrate aspects of the structure and manufacture of a section of a structured image icon layer according to various embodiments of this disclosure.

Referring to the non-limiting example of FIG. 3A, a section 300 of a structured image icon layer is shown. According to various embodiments, section 300 comprises a plurality of retaining structures (for example, retaining structure 301) which define isolated volumes. In this non-limiting example, each of the retaining structures of section 300 of the structured image layer comprises a square well of a first depth, d, as shown in FIG. 3A. According to various embodiments, the shape and depth of the retaining structures within section 300 may vary. Further, in some embodiments, the icon layer of which section 300 may comprise unstructured regions, or regions in which image icons may be formed by other methods.

In this illustrative example, a square region 310 defining a subset of the retaining structures in which a first zone of image icons comprising volumes of cured pigmented material of a first color is shown.

Figure 3B:
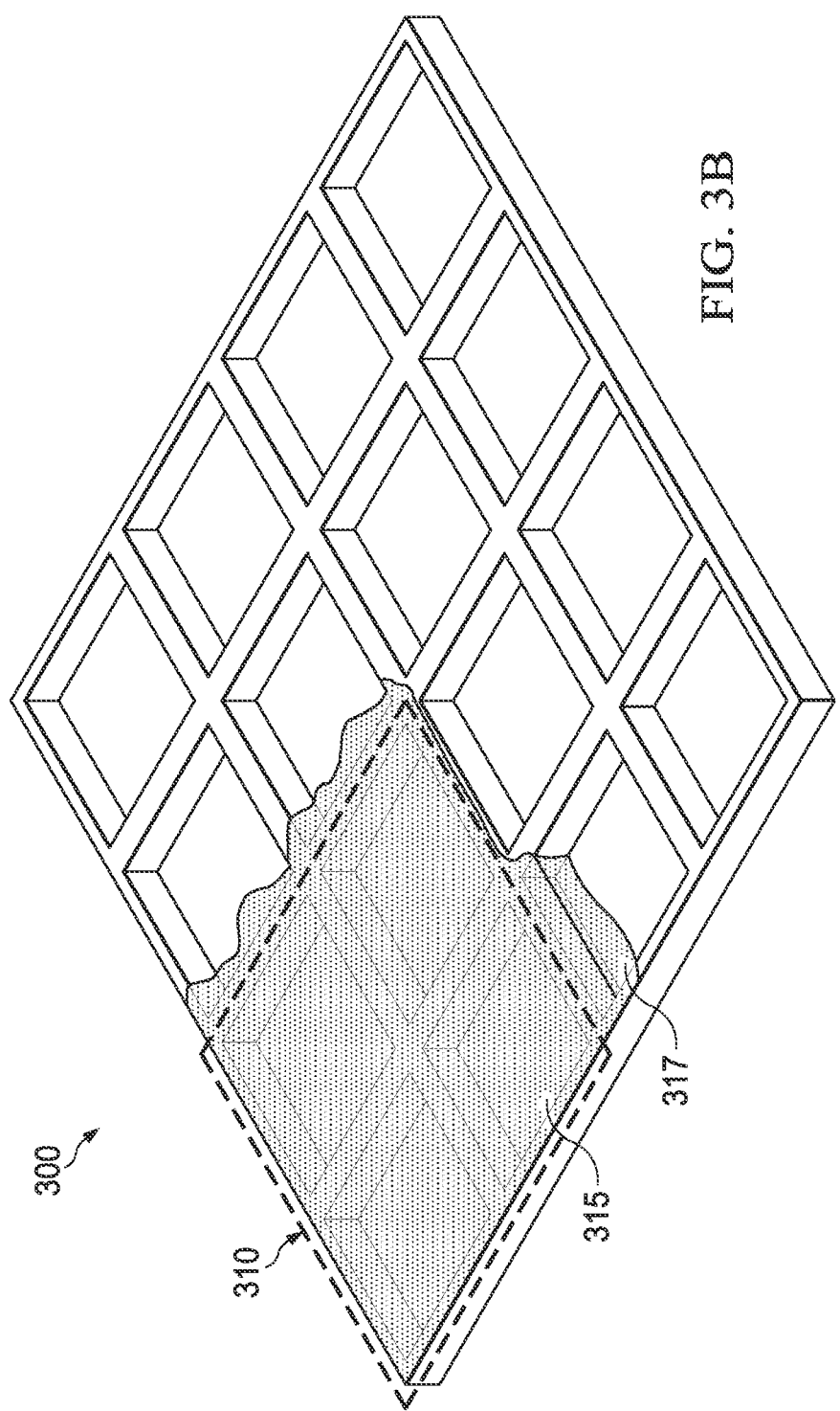

FIG. 3B illustrates an operation in forming a zonally cured image icon layer according to certain embodiments of this disclosure. As illustrated in the non-limiting example of FIG. 3, a layer 315 of uncured pigmented material of a first color (for example, a UV-reactive ink) has been applied to a portion of section 300 of the structured image layer including region 310. According to some embodiments, the layer 315 may be applied in a way (for example, by using chablons, or lithographic printing techniques) which attempts to limit the application of ink to retaining structures outside of region 310. As shown in the illustrative example of FIG. 3B, in some embodiments, despite efforts to mechanically exclude ink from retaining structures outside of region 310, some pigmented material (for example, excess ink 317) may occupy retaining structures outside of the area comprising the first zone of image icons. As discussed elsewhere in this disclosure, by zonally curing uncured pigmented material according to some embodiments of this disclosure, this overflow, or excess uncured pigment does not diminish the overall performance of the micro-optic device. Accordingly, in some embodiments of this disclosure, pigmented material of the first color is applied across the entirety of section 300.

Figure 3C:
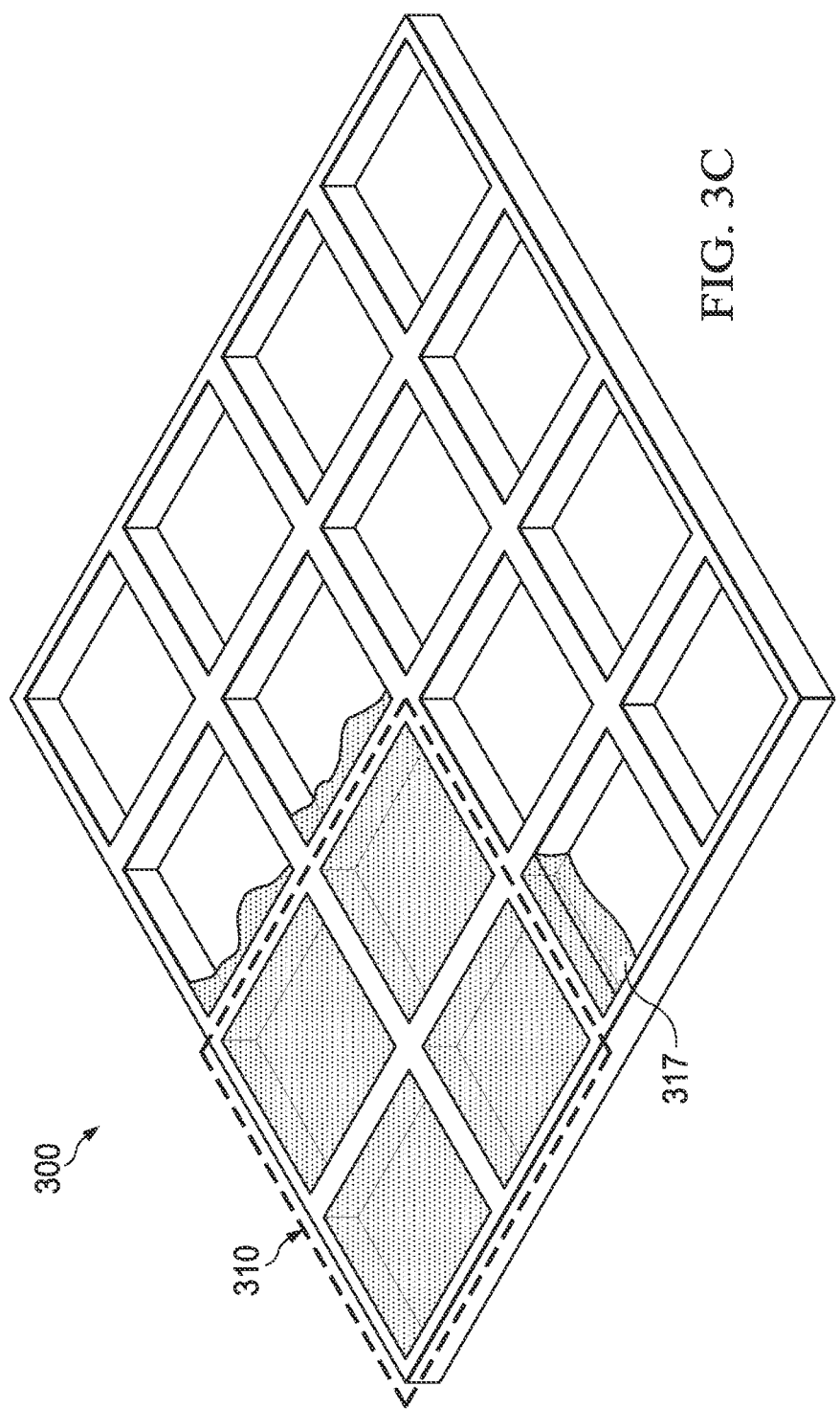

FIG. 3C illustrates an operation in forming a zonally cured image icon layer according to various embodiments of this disclosure. Referring to the non-limiting example of FIG. 3C, the structured image icon layer comprising section 300 is scraped (for example, by doctor blading the surface) such that uncured pigmented material of the first color primarily or exclusively remains in retaining structures of the image icon layer at depths equal to or less than first depth d. As shown in this disclosure, in some embodiments, certain of the retaining structures outside of region 310 will have pigmented material (for example, 317) of the first region 310. However, it has been found that the advantages of certain embodiments according to this disclosure, include the fact the presence of uncured pigmented material outside of a designated area prior to curing does not diminish the ability to produce a micro-optic security device which provides a user-engaging visual effect which includes sharp transitions between regions of color or clear, un-muddied colors.

Figure 3D:
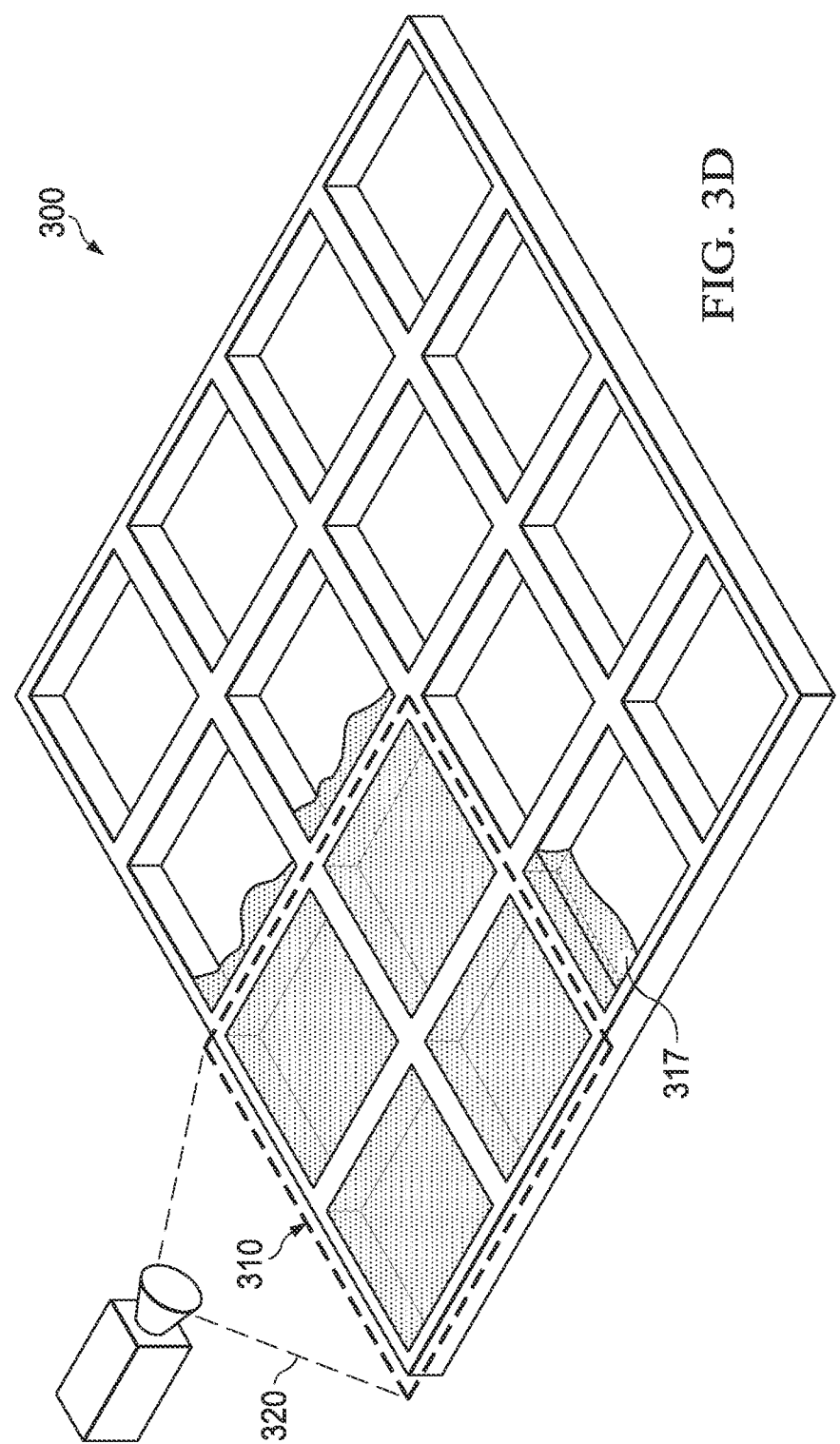

FIG. 3D illustrates an operation in forming a zonally cured image icon layer according to various embodiments of this disclosure. In certain embodiments according to this disclosure, the area of first region 310 is selectively, or zonally cured, using patterned light 320 of a frequency or wavelength suitable for curing the pigmented material of the first color in the retaining structures of the structured image icon layer to create image icons of a first zone of image icons within region 310. According to certain embodiments, areas of section 300 outside of region 310 are not zonally cured, and pigmented material of the first color remains substantially, if not entirely uncured. According to various embodiments, patterned light 320 is projected onto region 310 is provided by a UV projector rendering, with UV light pixels of a digital image (for example, a mask file). In some embodiments, patterned light 320 is projected by a rastering UV laser. In some embodiments according to this disclosure, patterned light 320 is projected directly at the surface of structured image icon layer comprising section 320. In certain embodiments, patterned light 320 is projected through focusing elements (for example, planar array of focusing elements 107 in FIG. 1) of a micro-optic security device comprising section 300. According to various embodiments, by zonally curing pigmented material through the focusing elements, the directionality (for example, the viewing angle at which a visual effect is visible) of visual effects provided by the micro-optic device can be controlled. Additionally, in certain embodiments, patterned light 320 can be projected both through the focusing elements and directly onto the structured image icon layer to create variations, within the security device, of the visual effect provided by the strip. In certain embodiments, the underlying pattern of patterned light 320 can be changed dynamically, or repeatedly during the manufacturing process. For example, in some embodiments, the underlying pattern of patterned light 320 could correspond to a serial number or batch number for a currency note, thereby heightening counterfeit resistance by making each micro-optic security device unique to a particular document.

Figure 3E:
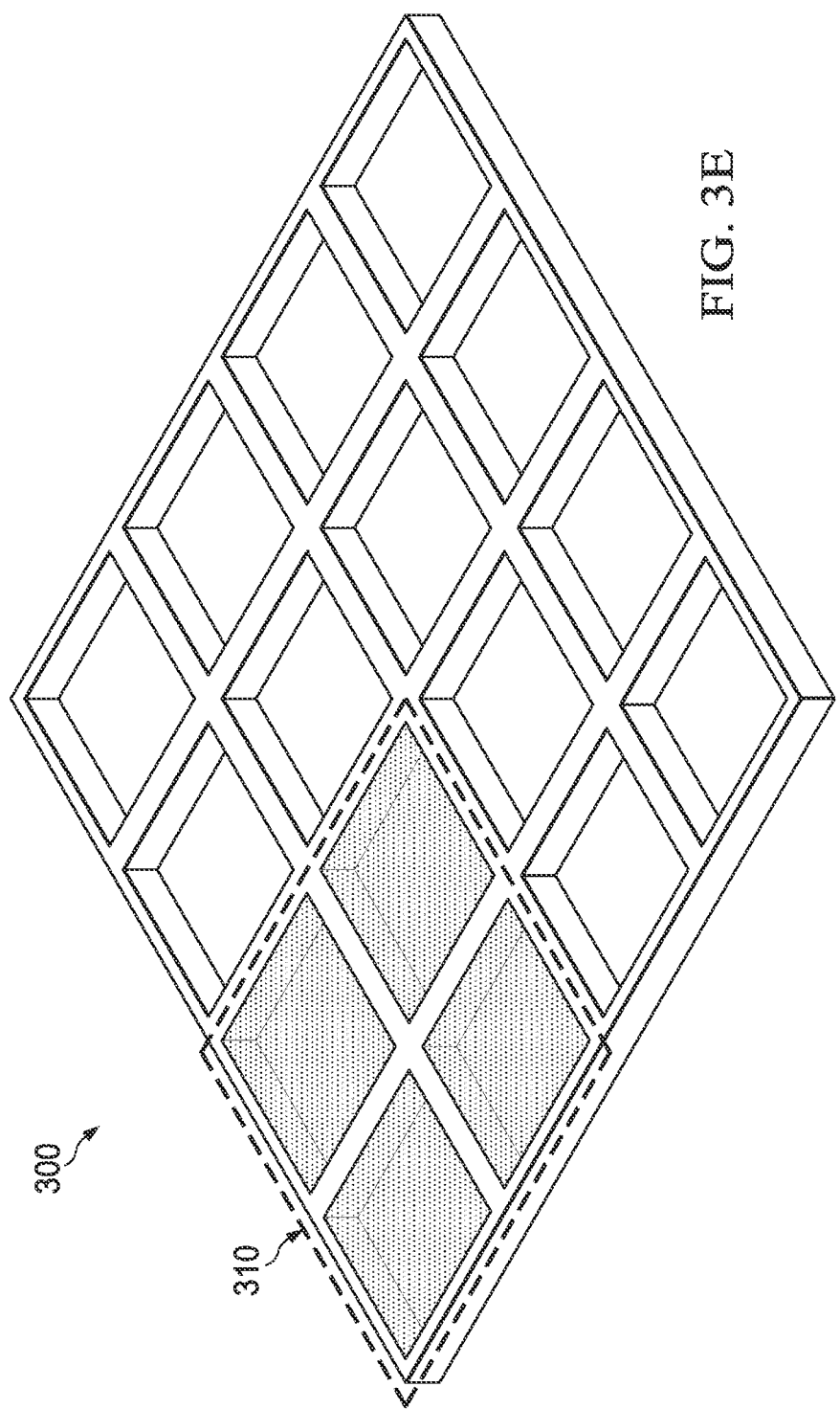

FIG. 3E illustrates an operation in forming a zonally cured image icon layer according to various embodiments of this disclosure. According to certain embodiments, all, or substantially all of uncured material of the first color is removed in the area outside of region 310 is removed, leaving only image icons of a first zone of image icons of a first color. In certain embodiments, the uncured pigmented of the material is removed using a spray wash of mild solvent, leaving the retaining structures outside of region 310 completely, or substantially free of pigmented material (cured or uncured) of the first color. In some embodiments, by selectively, or zonally curing the pigmented material of the first color, the incidence of smearing, or mixing of colors of image icons in retaining structures of the image icon layer is substantially reduced. Advantageously, this helps in producing micro-optic security devices which support visual effects characterized by sharp transitions between regions of different colors and clean colors.

Figure 3F:
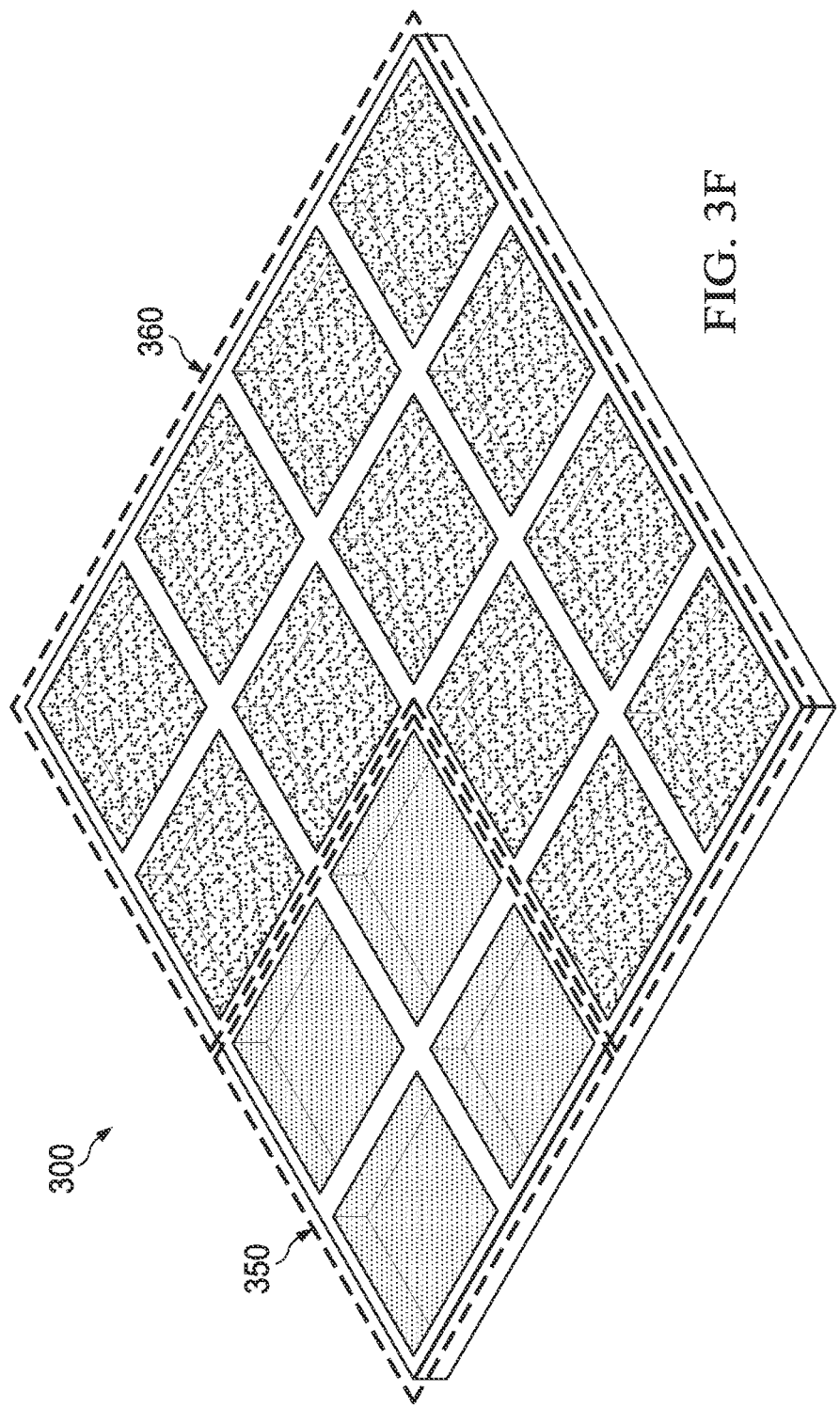

FIG. 3F illustrates an operation in forming a zonally cured image icon layer according to various embodiments of this disclosure. In certain embodiments, the operations described with reference to FIGS. 3A through 3F can be performed again with pigmented material of one or more additional colors, including second, third, fourth and further colors. Referring to the non-limiting example of FIG. 3F, the operations described with reference to FIGS. 3A through 3F have been performed again to create image icons of a first zone of image icons 350 and a second zone of image icons 360. In some embodiments, for example, embodiments in which the design of the security device specifies that every retaining structure of an image icon layer be filled with cured pigmented material, the final curing step may be performed using a flood cure, rather than a zonal cure.

Figure 4:
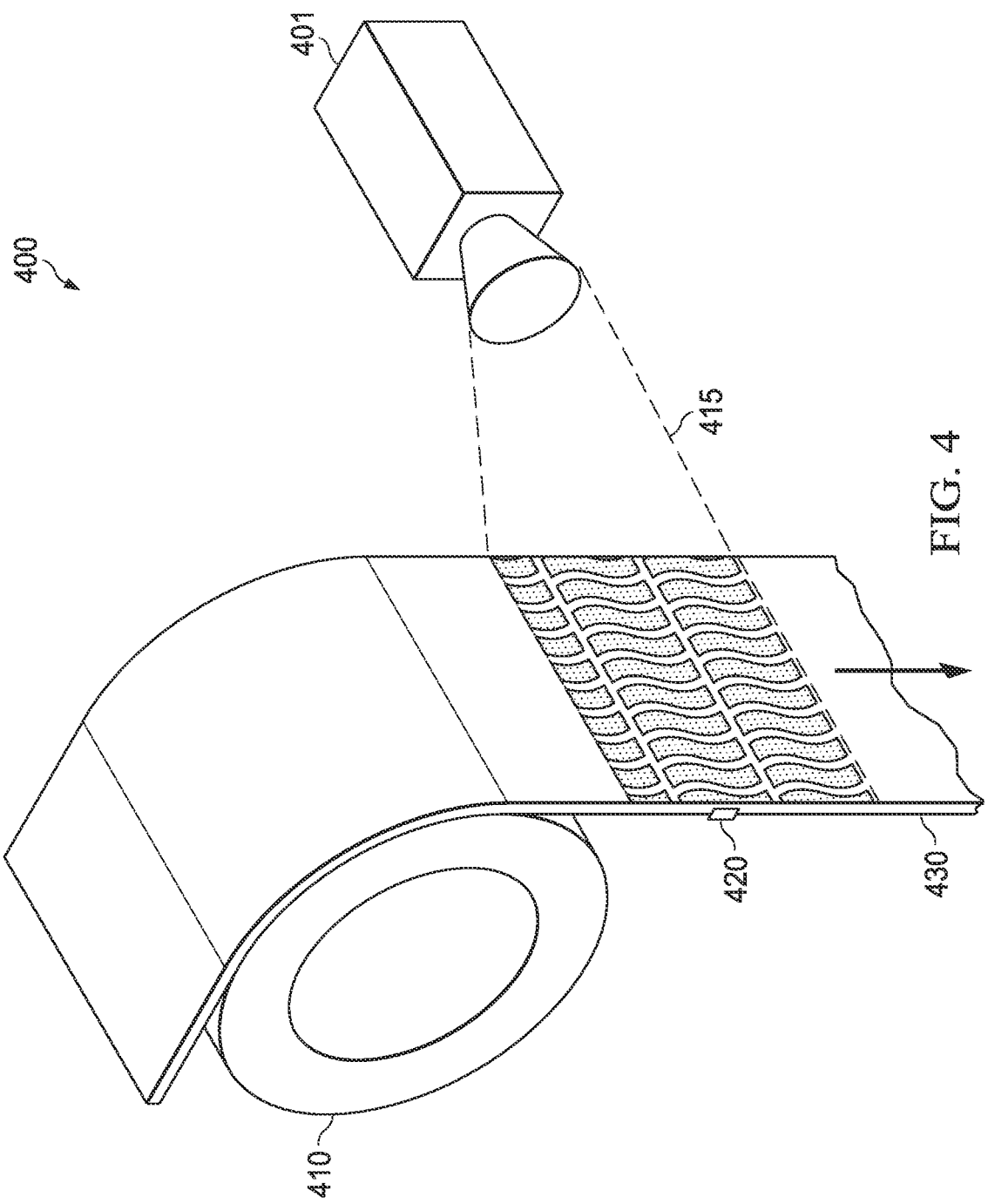
FIG. 4 illustrates aspects of an apparatus for zonally curing regions of uncured pigmented material according to various embodiments of this disclosure.

FIG. 4 illustrates aspects of an apparatus for zonally curing regions of uncured pigmented material according to various embodiments of this disclosure.

In many cases, micro-optic security devices and security documents incorporating same are constructed using roll-to-roll manufacturing processes, wherein a web of material is unspooled from a first roll, and mechanically and physically processed as it passes through one or more machines before being taken up on a second roll. Advantageously, image icon layers (for example, the image icon layer comprising section 300 in FIG. 3A) can be zonally pigmented and cured as part of a roll-to-roll manufacturing process for producing security strips.

Referring to the non-limiting example of FIG. 4, elements of an apparatus 400 for zonally curing an image icon layer of a micro-optic are illustrated. According to certain embodiments, apparatus 400 comprises a projector 401, a positioning roller 410, and a position sensor 420.

In some embodiments, projector 401 is configured to project a pattern of light 415 upon moving web 430, as it passes from positioning roller 410 to a wash station or other processing configured to remove uncured pigmented material. According to certain embodiments, projector 401 comprises a UV rastering laser, or a motion picture projector, or other apparatus capable of projecting a dynamic (e.g., moving in sync with moving web 430) pattern of light at a wavelength suitable for curing portions of a layer of uncured pigmented material on moving web 430. As shown in the illustrative example of FIG. 4, moving web 430 coated with a layer of uncured pigmented material of a first color passes over positioning roller 410 and into the projection zone of projector 401. According to various embodiments, positioning roller 410 operates to maintain a predetermined level of tension and flatness in moving web 430 as it passes into the projection zone of projector 401.

Referring to the non-limiting example of FIG. 4, position sensor 420 tracks the speed and current position of reference points (for example, score marks or other position indicators) in moving web 430 relative to projector 401 and provides positional data to a computer or other control apparatus for projector 401.

According to various embodiments, projector 401 is configured to project a pattern of curing light upon moving web 430 corresponding to zones of image icons of a first color as moving web 430 passes through the projection zone of projector 401. In certain embodiments, because moving web 430 is always moving, to realize the benefits of zonal curing, the pattern of light 415 projected by projector moves in sync with moving web 430, such that the same or substantially the same regions of the layer of uncured pigmented material are exposed to light as moving web 430 passes through the projection zone of projector 401. By the same token, pattern of light 415 is projected onto moving web 430 such that the same or substantially the same regions of the layer of uncured pigmented material are not exposed to light as moving web 430 passes through the projection zone of projector 401. Multiple instances of apparatus 400 can be incorporated as part of a roll-to-roll manufacturing system for micro-optic security devices according to embodiments of this disclosure. According to certain embodiments, a layer of uncured pigmented material of a first color is applied, zonally cured, and the uncured material washed off in preparation for repeating the process with a layer of uncured pigmented material of a second color.

Figure 5:
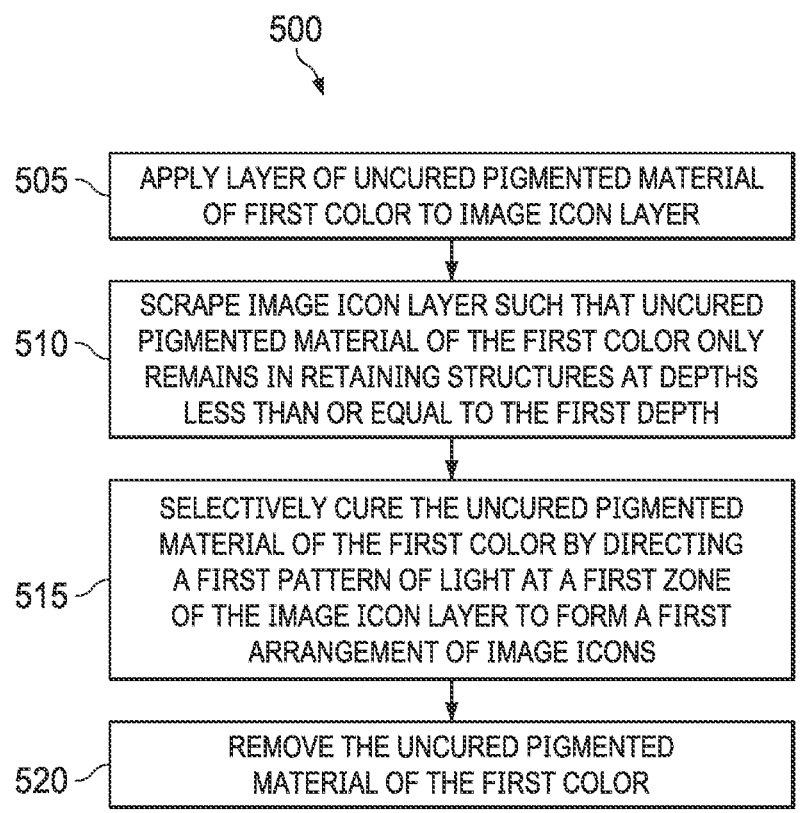
FIG. 5 illustrates operations of a method for making a zonally cured micro-optic security device according to various embodiments of this disclosure.

FIG. 5 illustrates operations of a method 500 for making a zonally cured micro-optic security device according to various embodiments of this disclosure.

Referring to the non-limiting example of FIG. 5, at operation 505, a layer of uncured pigmented material of a first color (for example, layer 315 in FIG. 3) is applied to an image icon layer (for example, image icon layer 220 in FIG. 2) of a micro-optic security device (for example, micro-optic security device 100 in FIG. 1). As noted elsewhere in this disclosure, the image icon layer can be part of a micro-optic security device using refractive (for example, an array of micro-lenses) or reflective (for example, an array of curved micro-mirrors) focusing elements.

According to certain embodiments, the image icon layer to which the layer of uncured pigmented material is applied to at operation 505 comprises a plurality of retaining structures (for example, retaining structure 230 in FIG. 2) which define isolated volumes having a first depth. In some embodiments, the layer of uncured pigmented material is filled to the first depth (e.g., "to the tops" of the retaining structures). In some embodiments, the applied layer fills all of the retaining structures of the image icon layer. In certain embodiments, the layer of uncured pigmented material of the first color is applied selectively, for example, by using chablons, or one or more print techniques (for example, inkjet, offset, flexo, split fountain or screen printing techniques) to apply uncured pigmented materials to some areas, but not others of the image icon layer.

As shown in the illustrative example of FIG. 5, at operation 510, the image icon layer is scraped such that uncured pigmented material of the first color remains in retaining structures at depths less than, or equal to the first depth. For example, as shown in FIG. 3C of this disclosure, the excess pigmented material on top of the image icon layer is removed, and ink remains in retaining structures. According to various embodiments, scraping the image icon layer at operation 510 is performed using a doctor blade. In some embodiments according to this disclosure, one or more solutions (for example, an oxygen inhibitor solution) is applied to the flats, or interstitial regions between retaining structures to prevent pigmented material in these areas from being cured, so that it can be washed away.

Referring to the non-limiting example of FIG. 5, at operation 515, the uncured pigmented material of the first color is selectively cured by directing a first pattern of light at a first zone (for example, region 310 in FIG. 3A) to form image icons of a first arrangement of image icons. According to certain embodiments, the image icons formed at operation 510 comprise volumes of cured pigmented material of the first color at positions defined by the retaining structures of the image icon layer.

In some embodiments, the selective curing performed at operation 510 is performed as part of a roll-to-roll manufacturing process, wherein a projector (for example, projector 401 in FIG. 4) is configured to project a pattern of light which is synchronized with the movement of a moving web comprising the image icon layer. In certain embodiments, a moving physical mask which is synchronized with the movement of the moving web is used to selectively expose zones within the image icon layer to curing light. According to various embodiments, the selective, or zonal, curing performed at operation 510 is performed by projecting the curing light directly upon the image icon layer. In certain embodiments, at operation 510, the curing light is projected indirectly upon the image icon layer (for example, through a planar array of focusing elements of a micro-optic security device.

As shown in the illustrative example of FIG. 5, at operation 520, the uncured pigmented material of the first color is removed from the image icon layer. In one illustrative embodiment, operation 520 is performed by passing the image icon layer through a spray station where a mild solvent is used to flush uncured pigmented material from the retaining structures of a structured image icon layer.

FIGS. 6A through 6E illustrates aspects of the structure and manufacture of a section 600 of a micro-optic security device according to various embodiments of this disclosure. For convenience and ease of reference elements of section 600 which are visible in more than one figure of FIGS. 6A through 6E are similarly numbered.

Figure 6A:
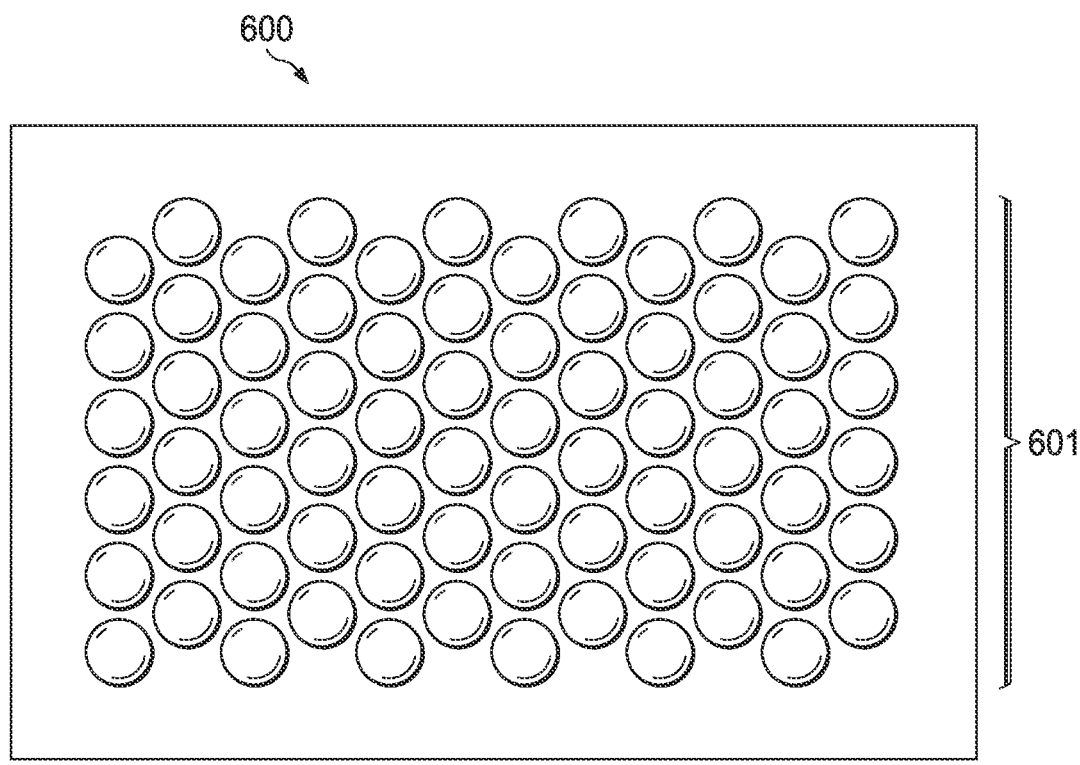
FIGS. 6A through 6E illustrate aspects of the structure and manufacture of a section of structured image icon layer according to various embodiments of this disclosure.

Referring to the non-limiting example of FIG. 6A, a top view of a section of a micro-optic security device (for example, device 100 in FIG. 1) according to certain embodiments of this disclosure is shown. In this illustrative example, focusing elements 601 of an array of focusing elements (for example, planar array of focusing elements 105 in FIG. 1). According to various embodiments, focusing elements of planar array of focusing elements 601 comprise lenses whose centers generally align with points of a planar hexagonal lattice. In some embodiments according to this disclosure, focusing elements 601 comprise reflective focusing elements, and are arrayed according to a different pattern (for example, a square or rectangular lattice. Further, in embodiments where focusing elements 601 are refractive focusing elements, depending on the construction of the micro-optic security device, focusing elements 601 can variously have concave or convex lensing surfaces.

Figure 6B:
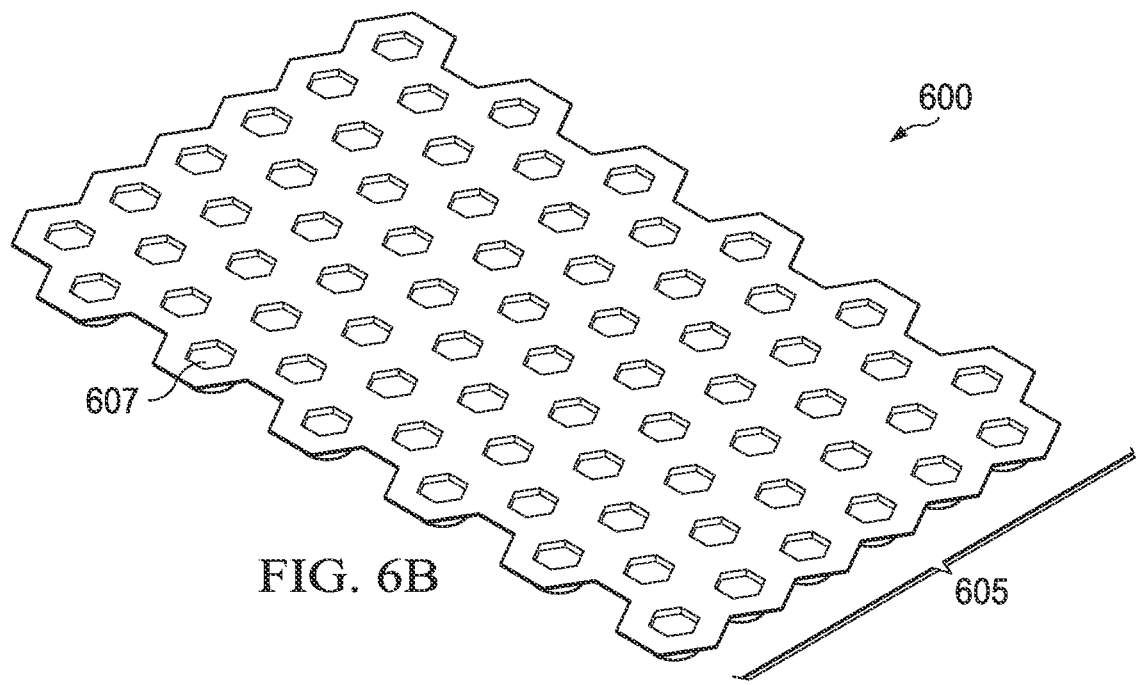

Referring to the non-limiting example of FIG. 6B, a bottom view of section 600 of the micro-optic security device is shown. In this illustrative example, an image icon layer 605 comprising a plurality of retaining structures (for example, retaining structure 607) is visible in this bottom view. As shown in this illustrative example, the retaining structures of image icon layer 605 are, like the focusing elements of planar array of focusing elements 601, arrayed in a planar hexagonal lattice. Further, in the non-limiting example of FIG. 6B the resolution of planar array of focusing elements 601 is the same, or substantially the same, as that of image icon layer 605, with one retaining structure positioned in the footprint of each focusing element. Other embodiments, with different geometries of retaining structures, and different relative resolutions of focusing elements and retaining structures are possible, and within the contemplated scope of this disclosure.

Figure 6C:
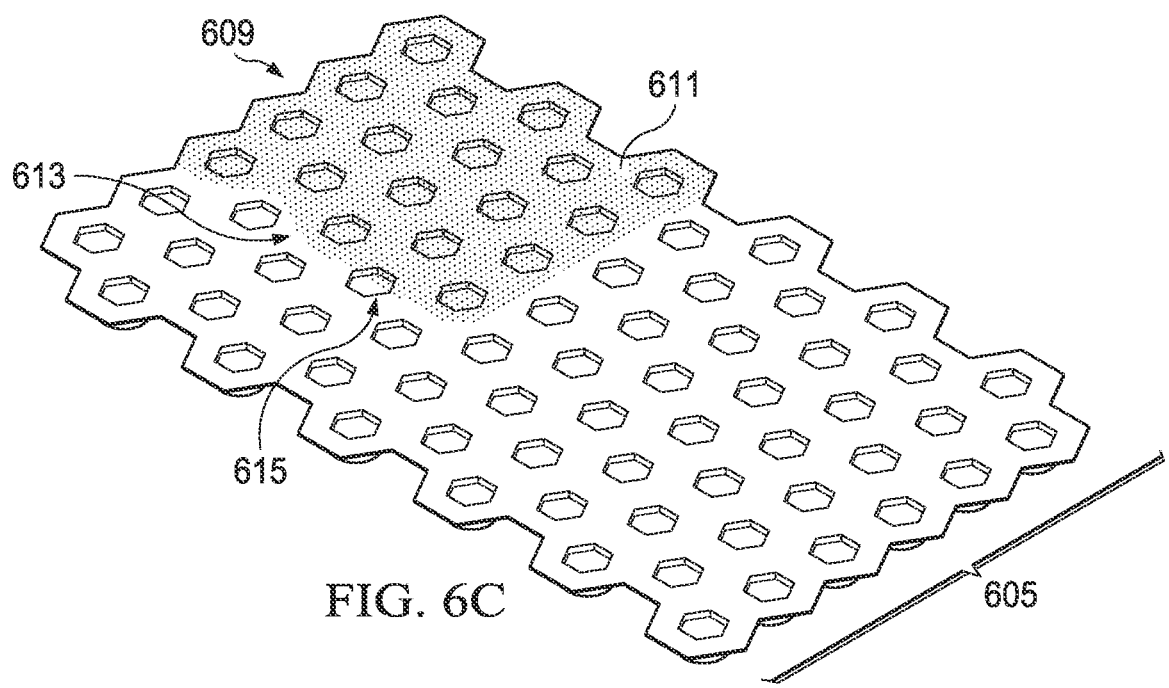

Referring to the non-limiting example of FIG. 6C, uncured pigmented material 609 of a first color has been selectively applied to a portion of image icon layer 605 such that it defines a first zone of color. According to various embodiments, uncured pigmented material 609 is selectively applied using by adapting one or more techniques for precisely applying ink to a final substrate (for example, paper or a polymeric substrate). Examples of suitable methods for applying uncured pigmented material 609 include, without limitation, inkjet printing, offset lithography, direct lithography, flexography, as well as variously changing the composition of uncured pigmented material 609 to tune a parameter (for example, hydrophilicity) related to its ability to wet image icon layer 605. According to certain embodiments, uncured pigmented material 609 is applied such that it overflows the retaining structures, thereby wetting interstitial spaces (for example, interstitial region 611, and forming one or more cohesive masses of liquid with an edge (for example, edge 613) on the surface of icon layer. Note also, that in certain embodiments according to this disclosure, one or more volumes (for example, volume 615) of uncured pigmented material 609 may partially fill one or more retaining structures within image icon layer 605.

Figure 6D:
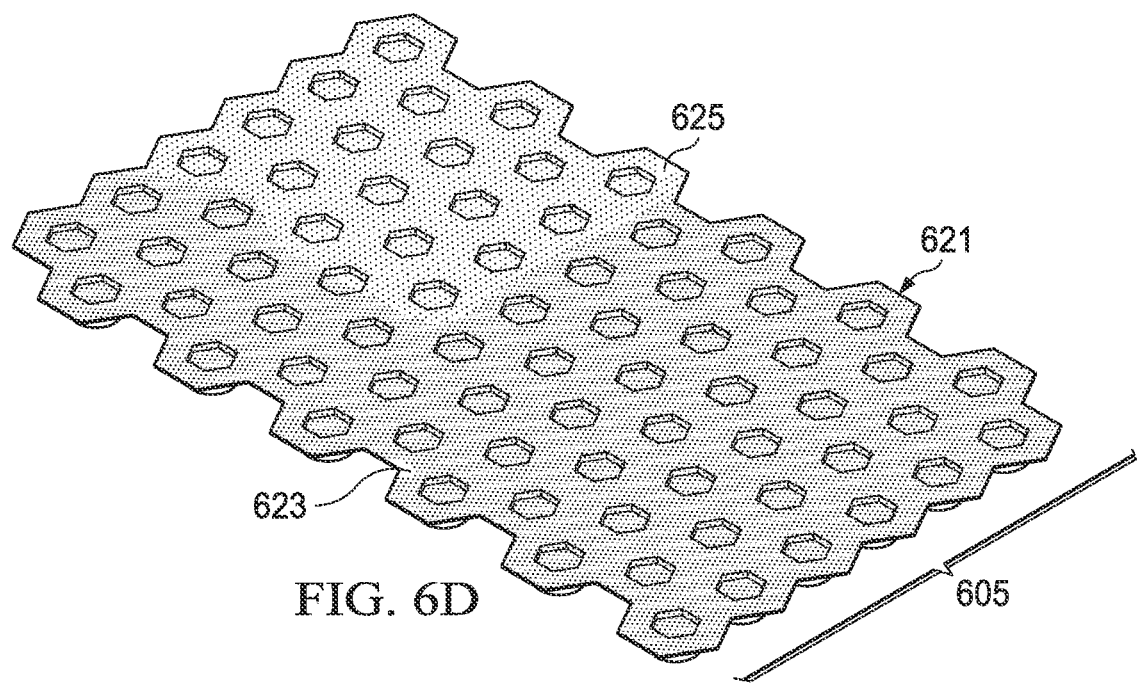

Referring to the non-limiting example of FIG. 6D, according to certain embodiments, after uncured pigmented material 609 of the first color is selective applied to image icon layer 605, uncured pigmented material 621 of a second color is applied to image icon layer 605 in an area corresponding to a second zone of color. According to various embodiments, uncured pigmented material 621 is likewise selectively provided in sufficient quantities to not only fill the retaining structures, but to also create one or more cohesive bodies of fluid covering interstitial space between the retaining structures (for example, interstitial space 623), but to also meet one or more cohesive bodies of uncured pigmented material of a different color (for example, uncured pigmented material 609) along one or more boundaries (for example, boundary 625. According to various embodiments, because retaining structures in the first zone have been filled with uncured pigmented material 609 to a suitable depth (for example, filling, or substantially filling retaining structures of depths in the range 1 μm-3 μm) uncured pigmented material 621 of the second color is not drawn into the retaining structures of the first zone. Thus, in certain embodiments according to this disclosure, boundary 625 occupies substantially the same location on image icon layer as edge 613.

Figure 6E:
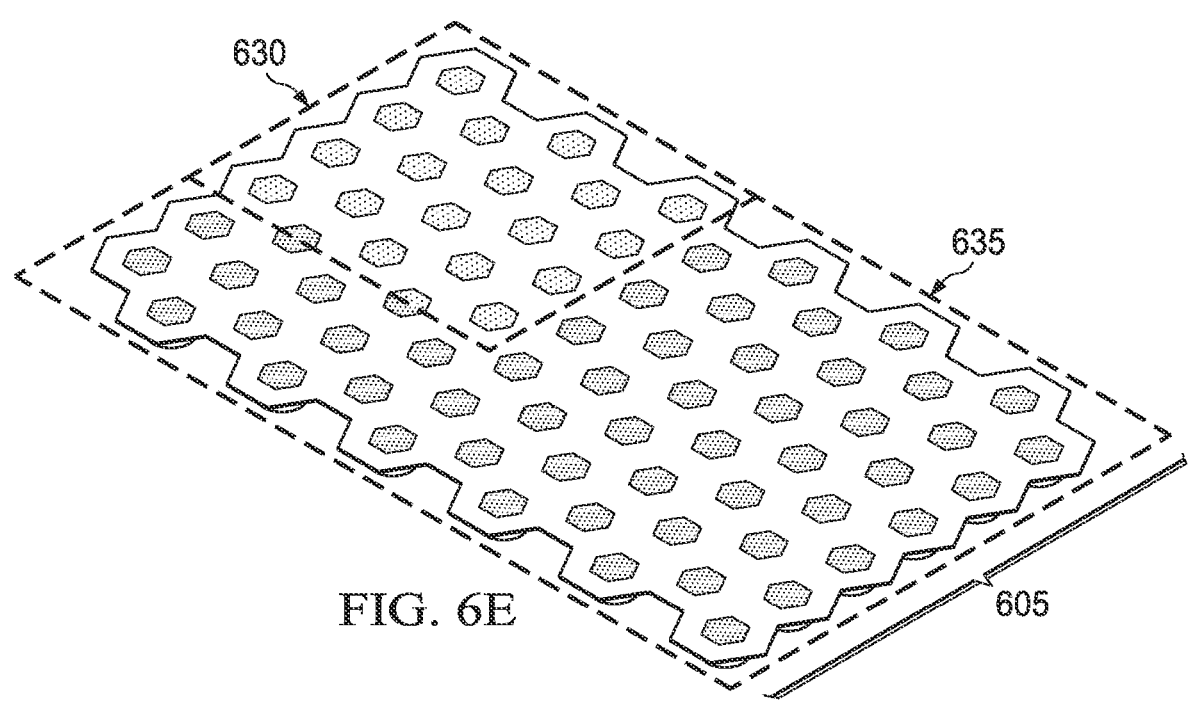

Referring to the non-limiting example of FIG. 6E, in certain embodiments according to this disclosure, the bulk, or excess, of uncured pigmented material 609 and uncured pigmented material 621 are removed from the interstitial spaces of image icon layer 605, leaving uncured pigmented material 609 of the first color substantially in a first zone 630, and uncured pigmented material 621 of the second color substantially in a second zone 635. While one or more retaining structures around the boundary between first zone 630 and second zone 635 may contain uncured pigmented material of multiple colors, this does not have a significant effect on the sharpness of color transitions achieved by a micro-optic security device incorporating image icon layer 605 for at least the following reasons. First, as discussed elsewhere in this disclosure, it has been observed that retaining structures which are filled, or mostly filled with unpigmented material of one color, do not draw unpigmented material of another color applied to nearby regions of the image icon layer. Second, and as discussed with reference to FIG. 7 of this disclosure, the effects of "out-of-zone" unpigmented material can, in some embodiments, be mitigated by zonal curing, or dilution of the "out-of-zone" material. According to various embodiments, uncured pigmented material 609 and uncured pigmented material 621 are cured, to catalyze a chemical reaction imparting structural stability to the material in the retaining structures.

Advantageously, much sharper color transitions, relative to transitions obtained by iteratively applying, blading, and curing uncured pigmented material one color at a time, in certain embodiments, be achieved by selectively applying uncured pigmented material of multiple colors to fill substantially all of the retaining structures of an image icon layer, removing all of the excess, and then curing multiple zones of color together.

Figure 7:
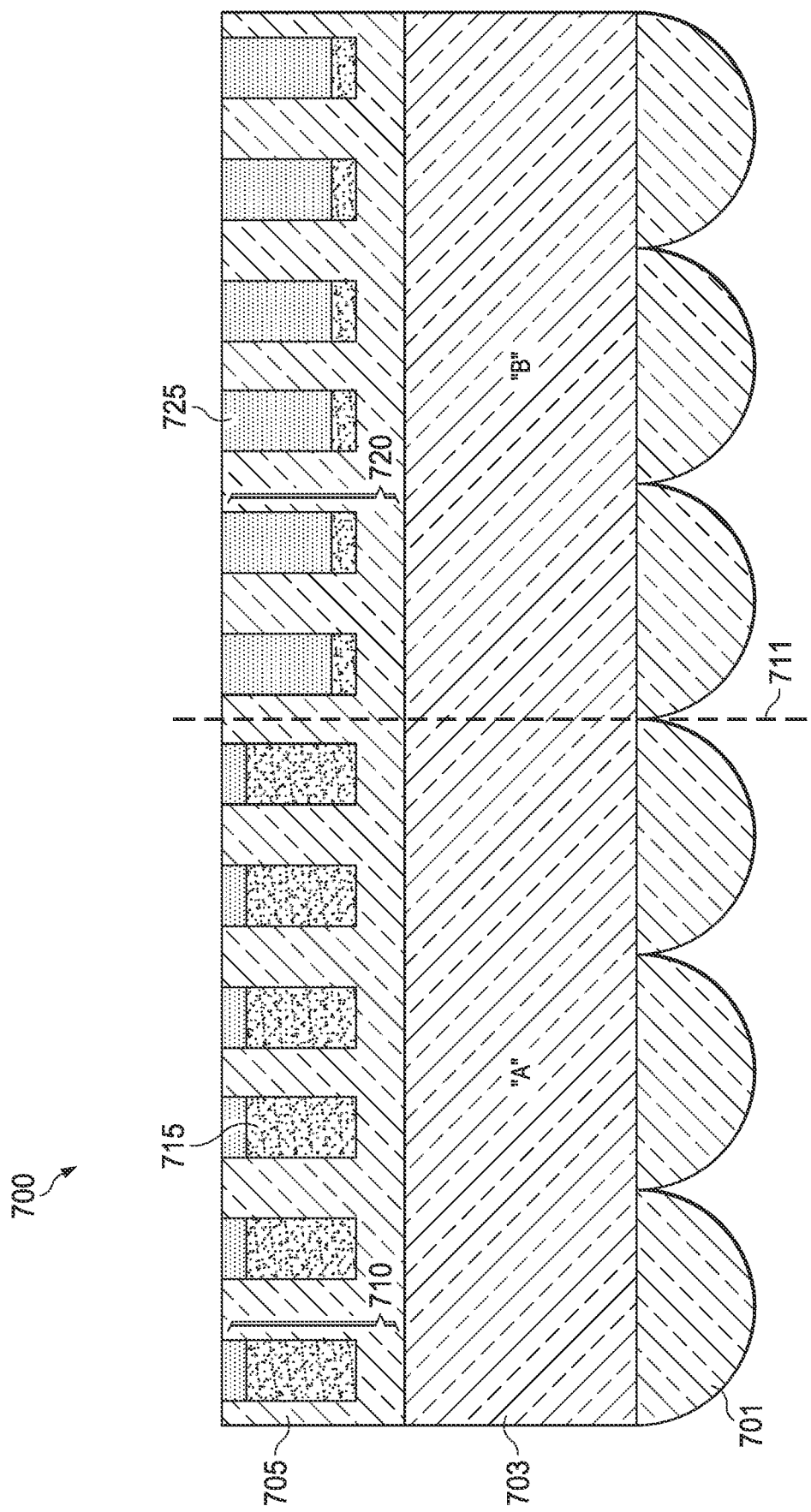
FIG. 7 illustrates an example of preserving sharp color transitions between zones within an image icon layer, according to certain embodiments of this disclosure.

FIG. 7 illustrates a non-limiting set of examples of how certain embodiments according to this disclosure can achieve sharp color transitions.

Referring to the non-limiting example of FIG. 7, a micro-optic device 700 according to certain embodiments of this disclosure illustrated. According to various embodiments, micro-optic device 700 comprises an array of focusing elements 701 (for example, array of focusing elements 601 in FIG. 6A). In some embodiments, micro-optic security device 700 further comprises an optical spacer 703 (for example, optical spacer 110 in FIG. 1). Additionally, in some embodiments, micro-optic device 700 comprises a structured image icon layer 705 (for example, the structured image icon layer comprising section 300 in FIGS. 3A-3F), which contains a plurality of retaining structures, including, for example, retaining structure 710.

As discussed elsewhere in this disclosure, the observed sharpness of transitions between a first region of image icons of a first color, and a second region of image icons of a second color in a visual effect (for example, a synthetic image) produced by a micro-optic device is enhanced when the incidence of image icons containing cured material of different colors is reduced, or more preferably, effectively eliminated.

Referring to the non-limiting example of FIG. 7, the portion of image icon layer 705 shown in FIG. 7 comprises the area around an intended boundary 711 between a first zone of a first color (marked "A" in the figure) and a second zone of a second color (marked "B" in the figure).

According to various embodiments, uncured pigmented material 715 (shown with diagonal line shading) of the first color is selectively applied to the image icon layer. As shown in this illustrative example, while uncured pigmented material 715 is selectively applied such that it primarily fills retaining structures in first zone "A," in some embodiments, some of uncured pigmented material 715 (also referred to herein as "out-of-zone" color) is present in retaining structures (for example, retaining structure 720) in second zone "B."

In embodiments utilizing zonal curing, the effect of on the performance of the micro-optic system from out-of-zone color from uncured pigmented material 715 can be minimized by zonally curing image icon layer 705 such that only the retaining structures in zone "A" are cured, thereby allowing out-of-zone uncured pigmented material 715 in zone "B" to be washed out before application of uncured pigmented material 725 of a second color (shown in the figure with cross-hatching) is applied.

Similarly, in certain embodiments wherein substantially all of the retaining structures of the image icon layer are filled with uncured pigmented material of two or more colors (for example, embodiments described with reference to FIGS. 6A-6E) the effect of out-of-zone uncured pigmented material 715 in zone "B" on the appearance of images produced by the micro-optic security device is similarly mitigated. According to certain embodiments, when uncured pigmented material 725 of the second color is introduced in retaining structures containing out-of-zone uncured pigmented material 715 of the first color (for example, retaining structure 720), the uncured pigmented materials mix prior to curing, and the performance problems associated with having pockets or volumes of cured material of two or more different colors at the "bottom" (i.e., the portion of the retaining structure most proximate to the focusing elements of the micro-optic device) can be avoided.

According to certain embodiments, uncured pigmented material 725 of a second color is selectively applied to image icon layer 705 and targeted at retaining structures in second zone "B" of image icon layer 705. In certain embodiments, amounts of uncured pigmented material 725 go out-of-zone into retaining structures (for example, retaining structure 710) in zone "A." Advantageously, it has been found that, in certain embodiments according to this disclosure, out-of-zone uncured pigmented material 725 does not affect the ability to achieve sharp color transitions in visual effects produced by micro-optic system 700.

For example, in some embodiments where the uncured pigmented material 715 of the first color is zonally cured before applying uncured pigmented material 725, the material of the first color occupies the "bottom" of the retaining structure, and the possibility of cured pigmented material in the portion of the image icon layer most proximate to the focusing elements is avoided. Similarly, in some embodiments, the uncured pigmented material 725 of the second color is zonally cured, and much, if not all, of the out-of-zone uncured pigmented material 725 can be washed away. In various embodiments, uncured pigmented material 725 of the second color is flood cured. However, the presence of cured material of the first color confines the out-of-zone uncured material 725 of the second color to portions of the retaining structure most distal from the focusing elements, where its presence is substantially unnoticeable in visual effects produced by micro-optic security device 700.

As a further example, in certain embodiments according to this disclosure, where uncured pigmented material 715 of the first color is initially selectively applied to target retaining structures in zone "A," it has been observed that, due to hydrostatic effects, retaining structures which are filled or substantially filled with uncured pigmented material 715 generally do not draw uncured pigmented material 725 of the second color. Additionally, where uncured pigmented material of different colors is present in a retaining structure, the uncured pigmented material mixes, and the problems associated with having different colors of cured pigmented material at the "bottom" of the retaining structure can be avoided.

Examples of micro-optic security devices according to various embodiments of this disclosure include micro-optic security devices comprising a planar array of focusing elements, an image icon layer comprising a plurality of retaining structures, the plurality of retaining structures defining isolated volumes at a first depth within the image icon layer, a first zone of image icons, the first zone of image icons comprising a first predefined subset of the plurality of retaining structures, wherein the isolated volumes of retaining structures of the first predefined subset of the plurality of retaining structures contain cured pigmented material of a first color, and a second zone of image icons, the second zone of image icons comprising a second predefined subset of the plurality of retaining structures, wherein the isolated volumes of retaining structures of the second predefined subset of the plurality of retaining structures contain cured pigmented material of a second color, wherein the second color contrasts with the first color.

Examples of micro-optic security devices according to various embodiments of this disclosure include micro-optic security devices wherein the cured pigmented material of the first color in the first zone of image icons is of a depth less than the first depth, and wherein the cured pigmented material of the second color in the second zone of image icons is of a depth equal to or greater than the first depth.

Examples of micro-optic security devices according to various embodiments of this disclosure include micro-optic security devices wherein the first predefined subset of the plurality of retaining structures corresponds to a dynamically customized display to be provided by the micro-optic security device.

Examples of micro-optic security devices according to various embodiments of this disclosure include micro-optic security devices wherein the dynamically customized display to be provided by the micro-optic security device comprises a unique alphanumeric identifier of the micro-optic security device.

Examples of micro-optic security devices according to various embodiments of this disclosure include micro-optic security devices wherein the dynamically customized display comprises image icons from the first zone of image icons and the second zone of image icons.

Examples of micro-optic security devices according to various embodiments of this disclosure include micro-optic security devices wherein image icons of the first zone of image icons and image icons of the second zone of image icons occupy locations in the image icon layer associated with a common phasing relationship relative to focusing elements of the planar array of focusing elements, wherein, when viewed through focusing elements of the planar array of focusing elements, the image icons of the first zone of image icons and image icons of the second zone of image icons, present a dynamic visual effect, whose appearance changes across ranges of viewing angles, and wherein the common phasing relationship of the first zone of image icons and second zone of image icons relative to focusing elements of the planar array produces sequential changes in the appearance of the dynamic visual effect.

Examples of micro-optic security devices according to various embodiments of this disclosure include micro-optic security devices wherein pigmented material of the first color is excluded from the second zone of image icons.

Examples of micro-optic security devices according to various embodiments of this disclosure include micro-optic security devices further comprising a layer of cured pigmented material disposed at a depth greater than or equal to the first depth, wherein the layer of cured pigmented material is in register with at least a portion of the plurality of retaining structures.

Examples of micro-optic security devices according to various embodiments of this disclosure include micro-optic security devices wherein focusing elements of the planar array of focusing elements are refractive focusing elements, and wherein the image icon layer is disposed proximate to a focal plane of the planar array of focusing elements.

Examples of micro-optic security devices according to various embodiments of this disclosure include micro-optic security devices wherein focusing elements of the planar array of focusing elements are reflective focusing elements, and wherein the image icon layer is disposed proximate to a focal plane of the planar array of focusing elements.

Examples of micro-optic security devices according to various embodiments of this disclosure include micro-optic security devices wherein each focusing element of the planar array of focusing elements has a footprint, wherein the first zone of image icons corresponds to portions of footprints of a first subset of focusing elements at which the first zone of image icons are visible at a predetermined range of viewing angles.

Examples of micro-optic security devices according to various embodiments of this disclosure include micro-optic security devices wherein the cured pigmented material of the first color comprises a light-curable ink, wherein the light-curable ink polymerizes in response to light wavelengths in an emission spectrum of a light emitting diode (LED) lamp.

Examples of micro-optic security devices according to various embodiments of this disclosure include micro-optic security devices further comprising a third zone of image icons comprising a third predefined subset of the plurality of retaining structures, wherein the isolated volumes of retaining structures of the first predefined subset of the plurality of retaining structures contain cured pigmented material of a third color, wherein the third color contrasts with the first and second colors.

Examples of micro-optic security devices according to various embodiments of this disclosure include micro-optic security devices wherein one or more image icons of the first zone of image icons is positioned proximate to one or more image icons of the second zone of image icons, such that, when viewed through focusing elements of planar array of focusing elements, the one or more image icons of the first zone of image icons proximate to the one or more image icons of the second zone of image icons appear as a region of a third color, and wherein the third color is a mixture of the first color and the second color.

Examples of methods of making a micro-optic security device according to various embodiments of this disclosure include methods comprising applying a layer of uncured pigmented material of a first color to an image icon layer of a micro-optic security device, the image icon layer comprising a plurality of retaining structures, the plurality of retaining structures defining isolated volumes at a first depth within the image icon layer, scraping the image icon layer such that uncured pigmented material of the first color remains in the retaining structures of the image icon layer at depths equal to or less than the first depth, selectively curing the uncured pigmented material of the first color by directing a first pattern of light at a first zone of the image icon layer to form a first arrangement of image icons, and removing the uncured pigmented material of the first color.

Examples of methods of making a micro-optic security device according to various embodiments of this disclosure include methods wherein the image icon layer is scraped with a doctor blade.

Examples of methods of making a micro-optic security device according to various embodiments of this disclosure include methods wherein the uncured pigmented material is removed with a spray wash.

Examples of methods of making a micro-optic security device according to various embodiments of this disclosure include methods further comprising selectively curing the uncured pigmented material of the first color using a DLP UV projector, an LED projector, or a rasterized projection from a UV laser.

Examples of methods of making a micro-optic security device according to various embodiments of this disclosure include methods further comprising applying a layer of uncured pigmented material of a second color to the image icon layer of the micro-optic security device, wherein the second color contrasts with the first color, scraping the image icon, and curing the uncured pigmented material of the second color.

Examples of methods of making a micro-optic security device according to various embodiments of this disclosure include methods further comprising flood curing the uncured pigmented material of the second color.

Examples of methods of making a micro-optic security device according to various embodiments of this disclosure include methods further comprising selectively curing the uncured pigmented material of the second color by directing a second pattern of light at a second zone of the image icon layer to form a second arrangement of image icons, and removing the uncured pigmented material of the second color.

Examples of methods of making a micro-optic security device according to various embodiments of this disclosure include methods further comprising applying a layer of uncured pigmented material of a third color to the image icon layer, wherein the third color contrasts with the first color and the second color, and curing the layer of uncured pigmented material of the third color.

Examples of methods of making a micro-optic security device according to various embodiments of this disclosure include methods wherein the first pattern of light is directed directly at the image icon layer.

Examples of methods of making a micro-optic security device according to various embodiments of this disclosure include methods comprising selectively applying a first volume of uncured pigmented material of a first color to a first region of an image icon layer of a micro-optic security device, the image icon layer comprising a plurality of retaining structures, the plurality of retaining structures defining isolated volumes at a first depth within the image icon layer, selectively applying a second volume of uncured pigmented material of a second color to a second region of the image icon layer of the micro-optic security device, wherein at least part of the second region contacts at least part of the first region along a wet border on a surface of the image icon layer, scraping the image icon layer such that uncured pigmented material of the first color is substantially confined to retaining structures in a first zone of the image icon layer, and uncured pigmented material of the second color is substantially confined to retaining structures in a second zone of the image icon layer, and curing the uncured pigmented material of the first color and the uncured pigmented material of the second color, wherein the first zone of the image icon layer and the second zone of the image icon layer meet along a region of the image icon layer proximate to the location of the wet border.

Examples of methods of making a micro-optic security device according to various embodiments of this disclosure include methods wherein the image icon layer is scraped with a doctor blade.

Examples of methods of making a micro-optic security device according to various embodiments of this disclosure include methods wherein the image icon layer is flood cured.

Examples of methods of making a micro-optic security device according to various embodiments of this disclosure include methods wherein one or more of the first zone of the image icon layer or the second zone of the image icon layer is zonally cured.

Examples of methods of making a micro-optic security device according to various embodiments of this disclosure include methods wherein the uncured pigmented material of the first color is selectively applied using one or more of inkjet printing, intaglio printing, chablons, offset lithography, direct lithography or flexographic printing.

Examples of methods of making a micro-optic security device according to various embodiments of this disclosure include methods comprising selectively applying a third volume of uncured pigmented material to a third region of the image icon layer, wherein the third color contrasts with the first and the second color, scraping the image icon layer such that uncured pigmented material of the first color is substantially confined to retaining structures in a first zone of the image icon layer, uncured pigmented material of the second color is substantially confined to retaining structures in a second zone of the image icon layer, and uncured material of the third color is substantially confined to retaining structures in a third zone of the image icon layer, and curing the uncured pigmented material of the first color, the uncured pigmented material of the second color, and the uncured pigmented material of the third color.

Examples of methods of making a micro-optic security device according to various embodiments of this disclosure include methods wherein the first pattern of light is directed indirectly at the image icon layer via one or more lensing surfaces of a planar array of focusing elements.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method of making a micro-optic security device, the method comprising:
    selectively applying a layer of uncured pigmented material of a first color to an image icon layer of a micro-optic security device, the image icon layer comprising a plurality of retaining structures, the plurality of retaining structures defining isolated volumes at a first depth within the image icon layer, wherein the selectively applied layer of uncured pigmented material defines a first zone comprising a subset of retaining structures of the plurality of retaining structures;
    scraping the image icon layer such that uncured pigmented material of the first color remains in the retaining structures of the image icon layer at depths equal to or less than the first depth;
    selectively curing the uncured pigmented material of the first color by directing a first pattern of light directly at the first zone of the image icon layer to form a first arrangement of image icons; and
    removing the uncured pigmented material of the first color,
    wherein the first pattern of light is directed directly at the image icon layer, and not through an array of focusing elements.

2. The method of claim 1, wherein the image icon layer is scraped with a doctor blade.

3. The method of claim 1, wherein the uncured pigmented material is removed with a spray wash.

4. The method of claim 1, further comprising:
    selectively curing the uncured pigmented material of the first color using a DLP UV projector, an LED projector, or a rasterized projection from a UV laser.

5. The method of claim 1, further comprising:
    applying a layer of uncured pigmented material of a second color to the image icon layer of the micro-optic security device, wherein the second color contrasts with the first color;
    scraping the image icon layer; and
    curing the uncured pigmented material of the second color.

6. The method of claim 5, further comprising:
    flood curing the uncured pigmented material of the second color.

7. The method of claim 5, further comprising:
    selectively curing the uncured pigmented material of the second color by directing a second pattern of light at a second zone of the image icon layer to form a second arrangement of image icons; and
    removing the uncured pigmented material of the second color.

8. The method of claim 7, further comprising:
    applying a layer of uncured pigmented material of a third color to the image icon layer, wherein the third color contrasts with the first color and the second color; and
    curing the layer of uncured pigmented material of the third color.

* * * * *